United States Patent
Makinen et al.

(10) Patent No.: US 11,624,934 B2
(45) Date of Patent: Apr. 11, 2023

(54) METHOD AND SYSTEM FOR APERTURE EXPANSION IN LIGHT FIELD DISPLAYS

(71) Applicant: InterDigital Madison Patent Holdings, SAS

(72) Inventors: Jukka-Tapani Makinen, Oulu (FI); Kai Ojala, Oulu (FI)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 16/761,166

(22) PCT Filed: Oct. 23, 2018

(86) PCT No.: PCT/US2018/057147
§ 371 (c)(1),
(2) Date: May 1, 2020

(87) PCT Pub. No.: WO2019/089283
PCT Pub. Date: May 9, 2019

(65) Prior Publication Data
US 2021/0173222 A1    Jun. 10, 2021

Related U.S. Application Data

(60) Provisional application No. 62/580,797, filed on Nov. 2, 2017.

(51) Int. Cl.
*G02B 5/18* (2006.01)
*G02B 27/42* (2006.01)
(Continued)

(52) U.S. Cl.
CPC ..... *G02B 27/4277* (2013.01); *G02B 27/0081* (2013.01); *G02B 27/30* (2013.01);
(Continued)

(58) Field of Classification Search
CPC .... G02B 27/4277; G02B 30/30; G02B 30/27; G02B 27/30; G02B 27/4205; G02B 27/0075; H04N 13/305; H04N 13/31
(Continued)

(56) References Cited

U.S. PATENT DOCUMENTS

| 4,210,391 A | 7/1980 | Cohen |
| 4,452,509 A | 6/1984 | VanBreemen |

(Continued)

FOREIGN PATENT DOCUMENTS

| CN | 1797175 A | 7/2006 |
| CN | 101002242 A | 7/2007 |

(Continued)

OTHER PUBLICATIONS

"Meet HOLOFLEX, World's First Holographic Flexible Smartphone". Gadgets Now, Web Article available at: http://www.gadgetsnow.com/mobiles/Meet-HoloFlex-worlds-first-holographic-flexible-smartphone/articleshow/52185503.cms. May 9, 2016, 2 pages.

(Continued)

*Primary Examiner* — Audrey Y Chang
(74) *Attorney, Agent, or Firm* — Smadar Gefen

(57) ABSTRACT

Display methods and apparatus are described. In some embodiments, to generate an image, light is selectively emitted from one or more light-emitting elements (such as a μLEDs) in a light-emitting layer. The emitted light from each element is collimated using, for example, an array of microlenses having small apertures. Each beam of collimated light is split by a first diffractive grating into a first generation of child beams, and the first generation of child beams is split by a second diffractive grating into a second generation of child beams. Beams in the second generation of child beams that are not parallel to the original beam of
(Continued)

collimated light may be blocked by a spatial light modulator (e.g. an LCD panel). The un-blocked beams operate in some respects as if they had been generated using optics with an aperture larger than the apertures of the microlenses.

17 Claims, 13 Drawing Sheets

(51) Int. Cl.
    *G02B 30/30*     (2020.01)
    *G02B 30/10*     (2020.01)
    *G02B 30/27*     (2020.01)
    *G02B 27/00*     (2006.01)
    *G02B 27/30*     (2006.01)

(52) U.S. Cl.
    CPC ......... *G02B 27/4205* (2013.01); *G02B 30/10* (2020.01); *G02B 30/27* (2020.01); *G02B 30/30* (2020.01)

(58) Field of Classification Search
    USPC ............ 345/8, 7; 348/51; 359/462, 463, 464
    See application file for complete search history.

(56) References Cited

U.S. PATENT DOCUMENTS

| | | | |
|---|---|---|---|
| 5,083,854 A | 1/1992 | Zampolin | |
| 5,132,839 A | 7/1992 | Travis | |
| 5,359,454 A | 10/1994 | Steenblik et al. | |
| 5,392,140 A | 2/1995 | Ezra | |
| 5,465,175 A | 11/1995 | Woodgate | |
| 5,566,024 A | 10/1996 | Rauch | |
| 5,742,262 A * | 4/1998 | Tabata | G02B 27/0081 345/8 |
| 5,959,664 A | 9/1999 | Woodgate | |
| 5,991,073 A | 11/1999 | Woodgate et al. | |
| 6,064,424 A | 5/2000 | van Berkel | |
| 6,118,584 A | 9/2000 | van Berkel | |
| 6,201,565 B1 | 3/2001 | Balogh | |
| 6,212,007 B1 | 4/2001 | Hentschke | |
| 6,554,430 B2 | 4/2003 | Dorval | |
| 6,642,969 B2 | 11/2003 | Tew | |
| 6,665,100 B1 | 12/2003 | Klug | |
| 6,919,900 B2 | 7/2005 | Wilt | |
| 6,999,071 B2 | 2/2006 | Balogh | |
| 7,446,733 B1 | 11/2008 | Hirimai | |
| 7,518,149 B2 | 4/2009 | Maaskant | |
| 7,573,491 B2 | 8/2009 | Hartkop | |
| 7,607,780 B2 | 10/2009 | Kim | |
| 7,710,636 B2 | 5/2010 | Chui | |
| 7,782,523 B2 | 8/2010 | Ishii | |
| 7,891,815 B2 | 2/2011 | Nayar | |
| 7,961,182 B2 | 6/2011 | Tachi | |
| 7,994,527 B2 | 8/2011 | Denbaars | |
| 8,047,660 B2 | 11/2011 | Penn | |
| 8,287,127 B2 | 10/2012 | Gao | |
| 8,328,360 B2 | 12/2012 | Gao | |
| 8,432,436 B2 | 4/2013 | Debevec | |
| 8,587,498 B2 | 11/2013 | Connor | |
| 8,605,026 B2 * | 12/2013 | Ko | G09G 3/3426 345/99 |
| 8,736,675 B1 | 5/2014 | Holzbach et al. | |
| 8,823,702 B2 | 9/2014 | Smithwick | |
| 8,848,006 B2 | 9/2014 | Wetzstein | |
| 8,872,085 B2 | 10/2014 | Gruhlke | |
| 8,958,137 B2 | 2/2015 | Haussler | |
| 9,298,168 B2 | 3/2016 | Taff | |
| 9,304,387 B2 | 4/2016 | Park | |
| 9,383,562 B2 | 7/2016 | Hartell | |
| 9,405,124 B2 | 8/2016 | Hirsch | |
| 9,523,797 B2 | 12/2016 | Yun | |
| 9,560,342 B2 | 1/2017 | Cho | |
| 10,154,252 B2 | 12/2018 | Yamagishi | |
| 10,394,036 B2 | 8/2019 | Hua | |
| 10,475,038 B1 | 11/2019 | Osborn et al. | |
| 2003/0112507 A1 | 6/2003 | Divelbiss | |
| 2003/0156077 A1 | 8/2003 | Balogh | |
| 2003/0176214 A1 | 9/2003 | Burak | |
| 2004/0135973 A1 | 7/2004 | Gustafsson | |
| 2004/0184145 A1 | 9/2004 | Fridman et al. | |
| 2004/0240033 A1 | 12/2004 | Pan et al. | |
| 2005/0086766 A1 | 4/2005 | Fawcett | |
| 2005/0094483 A1 | 5/2005 | Demers | |
| 2005/0180019 A1 | 8/2005 | Cho | |
| 2005/0190140 A1 | 9/2005 | Asahi | |
| 2006/0061846 A1 | 3/2006 | Sprague | |
| 2006/0245030 A1 | 11/2006 | Pan | |
| 2007/0053052 A1 | 3/2007 | Pan | |
| 2007/0070476 A1 | 3/2007 | Yamada et al. | |
| 2007/0121191 A1 | 5/2007 | Pan | |
| 2007/0139624 A1 | 6/2007 | Decusatis | |
| 2007/0171521 A1 | 7/2007 | Sugawara | |
| 2007/0247598 A1 | 10/2007 | Refai | |
| 2008/0007671 A1 * | 1/2008 | Klenke | G02F 1/133603 349/61 |
| 2008/0013147 A1 | 1/2008 | Pan | |
| 2008/0037120 A1 | 2/2008 | Koo et al. | |
| 2008/0094700 A1 | 4/2008 | Uehara | |
| 2008/0144174 A1 | 6/2008 | Lucente et al. | |
| 2008/0157412 A1 | 7/2008 | Kihara et al. | |
| 2008/0158245 A1 | 7/2008 | Lieb et al. | |
| 2008/0170293 A1 | 7/2008 | Lucente et al. | |
| 2008/0204847 A1 | 8/2008 | Kamm | |
| 2008/0225360 A1 | 9/2008 | Kkasazumi et al. | |
| 2008/0239421 A1 | 10/2008 | Yoshikawa et al. | |
| 2008/0297593 A1 | 12/2008 | Debevec | |
| 2009/0168146 A1 | 7/2009 | Hornbeck | |
| 2010/0033788 A1 | 2/2010 | Xie | |
| 2010/0103486 A1 | 4/2010 | Kroll | |
| 2010/0157026 A1 * | 6/2010 | Reichelt | H04N 13/354 348/51 |
| 2010/0214659 A1 | 8/2010 | Levola | |
| 2010/0232000 A1 | 9/2010 | Futterer | |
| 2010/0302351 A1 * | 12/2010 | Yanamoto | H04N 13/315 359/464 |
| 2011/0037953 A1 | 2/2011 | Nizani | |
| 2011/0128555 A1 | 6/2011 | Rotschild | |
| 2011/0234770 A1 | 9/2011 | Zerrouk | |
| 2011/0242150 A1 | 10/2011 | Song | |
| 2012/0050832 A1 | 3/2012 | Rosen et al. | |
| 2012/0105929 A1 | 5/2012 | Sung | |
| 2012/0139908 A1 | 6/2012 | Choi et al. | |
| 2012/0140131 A1 * | 6/2012 | Lanman | G02B 30/27 349/15 |
| 2013/0128087 A1 | 5/2013 | Georgiev | |
| 2013/0222384 A1 | 8/2013 | Futterer | |
| 2014/0016051 A1 | 1/2014 | Kroll et al. | |
| 2014/0028663 A1 | 1/2014 | Smithwick | |
| 2014/0043460 A1 | 2/2014 | Hartell | |
| 2014/0063077 A1 | 3/2014 | Wetzstein | |
| 2014/0111856 A1 | 4/2014 | Brug et al. | |
| 2014/0347361 A1 | 11/2014 | Alpaslan | |
| 2015/0033539 A1 | 2/2015 | El-Ghoroury | |
| 2015/0035880 A1 | 2/2015 | Heide et al. | |
| 2015/0097756 A1 | 4/2015 | Ziarati | |
| 2015/0160614 A1 | 6/2015 | Sung et al. | |
| 2015/0258838 A1 | 9/2015 | Fuhse et al. | |
| 2016/0014398 A1 | 1/2016 | Kroon | |
| 2016/0116752 A1 | 4/2016 | Wu | |
| 2016/0150225 A1 | 5/2016 | Kurashige | |
| 2016/0161752 A1 * | 6/2016 | Negoita | H01S 3/1307 359/572 |
| 2016/0313556 A1 | 10/2016 | Futterer | |
| 2016/0327906 A1 | 11/2016 | Futterer et al. | |
| 2016/0370695 A1 | 12/2016 | Miyasaka | |
| 2017/0010473 A1 | 1/2017 | Ide | |
| 2017/0102545 A1 | 4/2017 | Hua | |
| 2017/0108704 A1 | 4/2017 | Ishida | |
| 2017/0129272 A1 | 5/2017 | Rich | |
| 2017/0276957 A1 | 9/2017 | Matsuki | |
| 2017/0315371 A1 | 11/2017 | Johnson | |
| 2017/0371076 A1 | 12/2017 | Hua | |

(56) References Cited

U.S. PATENT DOCUMENTS

| | | | |
|---|---|---|---|
| 2018/0067057 A1* | 3/2018 | Shmarev | G01N 21/21 |
| 2018/0308401 A1 | 10/2018 | French | |
| 2018/0341219 A1 | 11/2018 | Shestak et al. | |
| 2019/0129192 A1 | 5/2019 | Yang et al. | |
| 2019/0152250 A1 | 5/2019 | Berthe et al. | |
| 2019/0197928 A1 | 6/2019 | Schubert et al. | |
| 2019/0198576 A1 | 6/2019 | Schubert et al. | |
| 2019/0199982 A1 | 6/2019 | Schubert et al. | |
| 2019/0200004 A1 | 6/2019 | Schubert et al. | |
| 2019/0222828 A1 | 7/2019 | Salvador et al. | |
| 2019/0271851 A1 | 9/2019 | Mukhtarov et al. | |
| 2019/0303001 A1 | 10/2019 | Kikuchi et al. | |
| 2019/0373249 A1 | 12/2019 | Kato et al. | |
| 2019/0387206 A1 | 12/2019 | Ishii et al. | |
| 2020/0301162 A1 | 9/2020 | Ogawa et al. | |
| 2020/0341292 A1 | 10/2020 | Sato et al. | |
| 2020/0346486 A1 | 11/2020 | Ochiai et al. | |
| 2020/0348454 A1 | 11/2020 | Kido | |
| 2020/0371378 A1 | 11/2020 | Makinen | |
| 2021/0041718 A1 | 2/2021 | Balogh | |
| 2021/0072556 A1 | 3/2021 | Kim et al. | |
| 2021/0092335 A1 | 3/2021 | Cramer | |
| 2021/0172709 A1 | 6/2021 | Cramer | |
| 2021/0173222 A1 | 6/2021 | Makinen et al. | |
| 2021/0185303 A1 | 6/2021 | Valli et al. | |
| 2021/0199984 A1 | 7/2021 | Park et al. | |
| 2021/0203913 A1 | 7/2021 | Kim et al. | |
| 2021/0223568 A1 | 7/2021 | Makinen et al. | |
| 2021/0364987 A1 | 11/2021 | Li et al. | |
| 2022/0075204 A1 | 3/2022 | Rudavskyi et al. | |
| 2022/0082853 A1 | 3/2022 | Tanahashi et al. | |
| 2022/0105742 A1 | 4/2022 | Dejean et al. | |
| 2022/0109824 A1 | 4/2022 | Makinen et al. | |
| 2022/0197052 A1 | 6/2022 | Makinen | |
| 2022/0199588 A1 | 6/2022 | Lu et al. | |
| 2022/0206313 A1 | 6/2022 | Park et al. | |
| 2022/0208037 A1 | 6/2022 | Chen et al. | |
| 2022/0264076 A1 | 8/2022 | Makinen | |
| 2022/0308356 A1 | 9/2022 | Makinen | |
| 2022/0311990 A1 | 9/2022 | Makinen et al. | |
| 2022/0321867 A1 | 10/2022 | Makinen et al. | |
| 2022/0357591 A1 | 11/2022 | Makinen | |
| 2022/0377310 A1 | 11/2022 | Yang et al. | |

FOREIGN PATENT DOCUMENTS

| | | |
|---|---|---|
| CN | 101123735 A | 2/2008 |
| CN | 101209583 A | 7/2008 |
| CN | 101855902 A | 10/2010 |
| CN | 102483544 A | 5/2012 |
| CN | 102645853 A | 8/2012 |
| CN | 102768410 A | 11/2012 |
| CN | 102854630 | 1/2013 |
| CN | 103529554 A | 1/2014 |
| CN | 104756494 A | 7/2015 |
| CN | 104769485 A | 7/2015 |
| CN | 105929547 A | 9/2016 |
| CN | 106164748 A | 11/2016 |
| CN | 106249394 A | 12/2016 |
| CN | 106569381 A | 4/2017 |
| CN | 106773589 | 5/2017 |
| CN | 106940483 A | 7/2017 |
| CN | 111065957 | 4/2020 |
| EP | 0797784 A1 | 10/1997 |
| EP | 0635138 B1 | 12/1997 |
| EP | 0961502 A2 | 12/1999 |
| EP | 1069454 | 1/2001 |
| EP | 1069454 A1 | 1/2001 |
| EP | 1447703 A1 | 8/2004 |
| EP | 2045648 B1 | 4/2009 |
| JP | H0772422 A | 3/1995 |
| JP | 3623265 B2 | 6/1996 |
| JP | H08166556 A | 6/1996 |
| JP | H08179259 A | 7/1996 |
| JP | H10170860 A | 6/1998 |
| JP | H11237848 A | 8/1999 |
| JP | 2003005129 | 1/2003 |
| JP | 2003075744 A | 3/2003 |
| JP | 2005078000 | 3/2005 |
| JP | 2006035416 A | 2/2006 |
| JP | 2007017536 A | 1/2007 |
| JP | 2007072049 A | 3/2007 |
| JP | 2014503836 A | 2/2014 |
| JP | 2014130305 A | 7/2014 |
| JP | 2017173486 A | 9/2017 |
| WO | 1993021548 A1 | 10/1993 |
| WO | 0144858 A2 | 6/2001 |
| WO | 2005086766 A2 | 9/2005 |
| WO | 2005094483 A2 | 10/2005 |
| WO | 2011149641 | 12/2011 |
| WO | 2012062681 A1 | 5/2012 |
| WO | 2013163468 A1 | 10/2013 |
| WO | 2014033484 | 3/2014 |
| WO | 2014063716 A1 | 5/2014 |
| WO | 2016004998 A1 | 1/2016 |
| WO | 2015077718 A9 | 6/2016 |
| WO | 2017005614 A1 | 1/2017 |
| WO | 2017062289 A1 | 4/2017 |
| WO | 2018014048 A2 | 1/2018 |
| WO | 2019089283 A1 | 5/2019 |
| WO | WO2019221993 A1 | 11/2019 |

OTHER PUBLICATIONS

Akeley, Kurt, et. al. "A Stereo Display Prototype with Multiple Focal Distances". ACM transactions on graphics (TOG), 23(3), (2004) pp. 804-813.

Andrew Dalton, "The HoloFlex is a flexible, glasses-free 3D display", Gadgetry, May 5, 2016.

Balogh, Tibor., et al., "The Holovizio System-New Opportunity Offered by 3D Displays". Proceedings of the TMCE, Apr. 2008, pp. 1-11.

Bimber, Oliver, et. al., "The Visual Computing of Projector-Camera Systems". EUROGRAPHICS, STAR—State of The Art Report, (2007), 25 pages.

Burvall, Anna, et. al., "Telephoto Axicon". Proceedings of SPIE, vol. 5962, Optical Design and Engineering II, (2005), 8 pages.

Erdenebat, Munkh-Uchral, et al., "Integral-Floating Display With 360 Degree Horizontal Viewing Angle". Journal of the Optical Society of Korea, vol. 16, Issue 4, Dec. 2012, pp. 365-371.

Fattal, David, et. al., "A Multi-Directional Backlight for A Wide-Angle, Glasses-Free Three-Dimensional Display". Nature, vol. 495, Mar. 21, 2013, pp. 348-351.

Flores, Angel, et. al., "Achromatic Hybrid Refractive-Diffractive Lens with Extended Depth of Focus". Applied Optics vol. 43, Issue 30, (2004), pp. 5618-5630.

Geng, Jason, "Design of a Single Projector Multiview 3D Display System". Emerging Digital Micromirror Device Based Systems and Applications VI, vol. 8979, 89790K, Mar. 7, 2014, 15 pages.

Hirsch Matthew, et al., "A Compressive Light Field Projection System". ACM Transactions on Graphics 33(4), (2014), pp. 1-12.

Hoffman, David, M., et. al., "Vergence—Accommodation Conflicts Hinder Visual Performance and Cause Visual Fatigue". Journal of Vision, vol. 8, No. 33., (2008), pp. 1-30.

International Preliminary Report on Patentability for PCT/US2018/028949 dated Oct. 29, 2019, 7 pages.

International Preliminary Report on Patentability for PCT/US2018/047313 dated Feb. 25, 2020, 7 pages.

International Search Report and Written Opinion of the International Searching Authority for PCT/US2018/028949 dated Jul. 4, 2018.

International Search Report and Written Opinion of the International Searching Authority for PCT/US2018/047313 dated Nov. 29, 2018.

International Search Report and Written Opinion of the International Searching Authority for PCT/US2018/057147 dated Feb. 1, 2019, 12 pages.

International Search Report and Written Opinion of the International Searching Authority for PCT/US2019/018018 dated Apr. 26, 2019, 11 pages.

(56) References Cited

OTHER PUBLICATIONS

Jones, Andrew, et. al., "An Interactive 360° Light Field Display", USC Centers for Creative Technology, (2007), 4 pages.
Jones, Andrew, et. al., "Rendering for An Interactive 360° Light Field Display". In SIGGRAPH papers, Article No. 40, (2007), 10 pages.
Katal, Goldy et al., "Digital Light Processing and its Future Applications". International Journal of Scientific and Research Publications, vol. 3 Issue 4, Apr. 2013, pp. 1-8.
Lee, Vincent W., et al. "Micro-LED Technologies and Applications". Information Display 6/16, (2016), pp. 16-23.
Lim, Yongjun, et. al., "360-Degree Tabletop Electronic Holographic Display". Optics Express, vol. 24, Issue 22, Oct. 31, 2016, pp. 24999-25009.
Love, Gordon D., et al., "High-Speed Switchable Lens Enables the Development of a Volumetric Stereoscopic Display". Optics Express, vol. 17, No. 18, Aug. 31, 2009, pp. 15716-15725.
Maimone, Andrew, et al., "Focus 3D: Compressive Accommodation Display". ACM Trans. Graph. 32.5 (2013), pp. 153: 1-153: 13.
Reichelt, Stephan, et. al., "Holographic 3-D Displays—Electro-Holography Within the Grasp of Commercialization". Advances in Lasers and Electro Optics, book edited by Nelson Costa and Adolfo Cartaxo, Apr. 2010, pp. 683-710.
Smalley, D. E., et al., "Anisotropic Leaky-Mode Modulator for Holographic Video Displays". Macmillan Publishers Limited, Nature, vol. 498, Jun. 20, 2013, pp. 313-317.
Sullivan, Alan, "A solid-state multi-planar volumetric display". SID Symposium Digest of Technical Papers vol. 34, Issue 1, (2003), pp. 1531-1533.
Toussaint, Kimani C., et. al., "Generation of Optical Vector Beams with A Diffractive Optical Element Interferometer". Optics Letters vol. 30, Issue 21, Nov. 1, 2005, pp. 2846-2848.
Urey, Hakan, "Diffractive Exit-Pupil Expander for Display Applications". Applied Optics, vol. 40, No. 32, Nov. 10, 2001, pp. 5840-5851.
Waldis, Severin, et. al., "Uniform Tilt-Angle Micromirror Array for Multi Object Spectroscopy". Proceedings of SPIE, MOEMS and Miniaturized Systems VI, vol. 6466, p. 646603, (2007), 12 pages.
Wallace, John, "Highly Flexible OLED Light Source Has 10 Micron Bend Radius". Laser Focus World, Web Article available at: http://www.laserfocusworld.com/articles/2013/07/highly-flexible-oled-light-source-has-10-micron-bend-radius.html, Jul. 31, 2013, 2 pages.
Weitao, Song. et. al., "Design of Light Field Head-Mounted Display", Visual Communications and Image Processing, vol. 9293, Dec. 17, 2014, pp. 92930J-92930J.
Wetzstein, Gordon, et al., "Layered 3D: Tomographic Image Synthesis for Attenuation-Based Light Field and High Dynamic Range Displays". ACM Transactions on Graphics, vol. 30, No. 4, Article 95, Jul. 2011, pp. 1-11.
Wikipedia, "Volumetric Display". Wikipedia web article, updated on Jul. 17, 2017, available at: https://en.wikipedia.org/w/index.php?title=Volumetric_display&oldid=790957389.
Xia, Xinxing, et al., "A 360-degree floating 3D display based on light field regeneration", Optical Society of America, vol. 21, No. 9, May 2013, 11 pages.
Lee, Vincent W., et. al., "Micro-LED Technologies and Applications". Information Display, vol. 32, No. 6, (2016), pp. 16-23.
Templier, François, et. al. "A Novel Process for Fabricating High-Resolution and Very Small Pixel-pitch GaN LED Microdisplays". SID Symposium Digest of Technical Papers, vol. 48, No. 1, (2017), pp. 268-271.
Wetzstein, Gordon, et. al. "Tensor Displays: Compressive Light Field Synthesis using Multilayer Displays with Directional Backlighting". ACM Transactions on Graphics, vol. 31, No. 4, Article 80, Jul. 2012, pp. 1-11.
Batbayar, Densmaa, et. al. "Point Light Source Display With A Large Viewing Angle Using Multiple Illumination Sources". Optical Engineering, vol. 56, No. 5, Article 053113, May 2017, pp. 1-5.
International Search Report and Written Opinion of the International Searching Authority for PCT/US2019/047761 dated Nov. 15, 2019, 13 pages.
Geng, Jason, "Three-Dimensional Display Technologies". Advances in Optics and Photonics, vol. 5, No. 4, Nov. 22, 2013, p. 497.
Jasper Display Corporation, "2014 NAB JDC Announced 4K2K LCoS with Associated Controller for Future Home Solutions". Jasper Display Corporation Press Release, Apr. 3, 2014, 3 pages.
Texas Instruments, "DLP7000 DLP 0.7 XGA 2x LVDS Type A DMD". DLP7000 product description, DLPS026E, May 2017, 51 pages.
Wacyk, Ihor, et al., "Ultra-High Resolution and High-Brightness AMOLED". Proceedings of SPIE vol. 8383, (2012), pp. 1-14.
Business Wire, "Kopin Debuts Lightning OLED Microdisplay With 2k x 2k Resolution for Mobile VR at 2017 CES". Business Wire Press Release, available at: https://www.businesswire.com/news/home/20170104005430/en/, Jan. 4, 2017, 6 pages.
International Preliminary Report on Patentability for PCT/US2019/047761 dated Mar. 2, 2021, 9 pages.
Braga-Mele, Rosa, et. al., "Multifocal Intraocular Lenses: Relative Indications and Contraindications for Implantation". Journal of Cataract & Refractive Surgery, vol. 40, No. 2, (2014), pp. 313-322.
Findl, Oliver, "Intraocular Lens Materials and Design". Chapter 12 in Achieving Excellence in Cataract Surgery, A Step-by-Step Approach (edited by Michael Colvard, MD, FACS), (2009), pp. 95-108.
Huang, Fu-Chung, "The Light Field Stereoscope: Immersive Computer Graphics via Factored Near-Eye Light Field Displays with Focus Cues". ACM SIGGRAPH, Transactions on Graphics, vol. 33, No. 5, (2015).
Jesacher, Alexander, et. al., "Multi-Focal Light Microscopy Using Liquid Crystal Spatiallight Modulators". IEEE International Symposium on Optomechatronic Technologies, (2012), pp. 1-2.
Jia, Kemiao, et al., "High-Fill-Factor Micromirror Array with Hidden Bimorph Actuators and Tip-Tilt-Piston Capability". Journal of Microelectromechanical Systems, vol. 20, Issue 3, (2011), pp. 573-582.
Kololuoma, Terho K. et. al., "Fabrication and Characterization of Hybrid-Glass-Based Axicons" Optical Engineering, vol. 41, No. 12, (2002), pp. 3136-3141.
Marrella, Alessandro et al., "Privacy-Preserving Outsourcing of Pattern Mining of Event-Log Data—An Use-Case from Process Industry". IEEE International Conference on Cloud Computing Technology and Science (CloudCom), (2016), pp. 545-551.
Takaki, Yasuhiro, et. al. "High-Density Directional Display for Generating Natural Three-Dimensional Images". Proceedings of the IEEE, vol. 94, No. 3, Mar. 2006, pp. 654-663.
Traub, Alan C., "Stereoscopic Display Using Rapid Varifocal Mirror Oscillations". Applied Optics vol. 6, Issue 6, Jun. 1967, pp. 1085-1087.
Wu, L., et. al., "A Large-Aperture, Piston-Tip-Tilt Micromirror For Optical Phase Array Applications". IEEE 21st International Conference on Micro Electro Mechanical Systems, (2008), pp. 754-757.
Yan, Jun, et. al., "Autostereoscopic Three-Dimensional Display Based on A Micromirror Array". Applied Optics, vol. 43, Issue 18, (2004), pp. 3686-3696.
Zhang, Yan, et. al., "Multi-View Autostereoscopic 3D Display". International Conference on Optics, Photonics and Energy Engineering (OPEE), IEEE, vol. 1, (2010) pp. 58-61.
International Preliminary Report on Patentability for PCT/US2018/057147 dated May 5, 2020, 8 pages.
International Preliminary Report on Patentability for PCT/US2019/018018 dated Aug. 27, 2020, 8 pages.
Kim, N. et al. "Advances in the light field displays based on integral imaging and holographic techniques." Chinese Optics Letters 12, No. 6: 060005. Jun. 10, 2014. (5 pages).
Jianshe, M. et al. "Holographic Display System of Digital Micro-Mirror Devices Based on LED Light Source." Acta Optica Sinica vol. 36, No. 7: 0709001 Jul. 2016 (7 pages).
Feather, G., et al., "The digital micromirror device for projection display." In Proceedings IEEE International Conference on Wafer Scale Integration, International Conference on Water Scale Integration (ICWSI), IEEE, 1995, pp. 43-51 (9 pages).

(56) References Cited

OTHER PUBLICATIONS

Dudley, D. et al., "Emerging digital micromirror device (DMD) applications." In MOEMS display and imaging systems, International Society for Optics and Photonics, 2003, vol. 4985, pp. 14-25 (12 pages).
Hornbeck, L. J. "Current status of the digital micromirror device (DMD) for projection television applications." In Proceedings of IEEE International Electron Devices Meeting, . IEEE, 1993, pp. 381-384 (4 pages).
Lanman et al.,"Content-adaptive parallax barriers: optimizing dual-layer 3D displays using low-rank light field factorization." In ACM Transactions on Graphics 29, No. 6, Article 163, pp. 1-11, 2010.
International Preliminary Report on Patentability for PCT/US2020/015459, 8 pages, dated Jul. 27, 2021.
Cao et al., "Load-balancing Multi-LCD Light Field Display", Stereoscopic Displays and Applications XXVI, Proceeding of SPIE, International Society for Optics and Photonics, vol. 9391, 14 pages., Mar. 16, 2015.
Zhang et al., "Unified Mathematical Model for Multilayer-Multiframe Compressive Light Field Displays Using LCDs", IEEE Transactions on Visualization and Computer Graphics, vol. 25, No. 3, pp. 1603-1614, Mar. 2019.
Heide et al., "Cascaded Displays: Spatiotemporal Superresolution using Offset Pixel Layers", ACM Transactions on Graphics, ACM, vol. 33, No. 4. pp. 1-11, Jul. 27, 2014.
International Search Report and Written Opinion of the International Searching Authority for PCT/US2020/015459, 12 pages, dated Apr. 28, 2020.
Gotoda et al., "A multilayer liquid crystal display for autostereoscopic 3D viewing", Proc. SPIE 7524, Stereoscopic Displays and Applications XXI, 75240P, 8 pages, 2010.

* cited by examiner

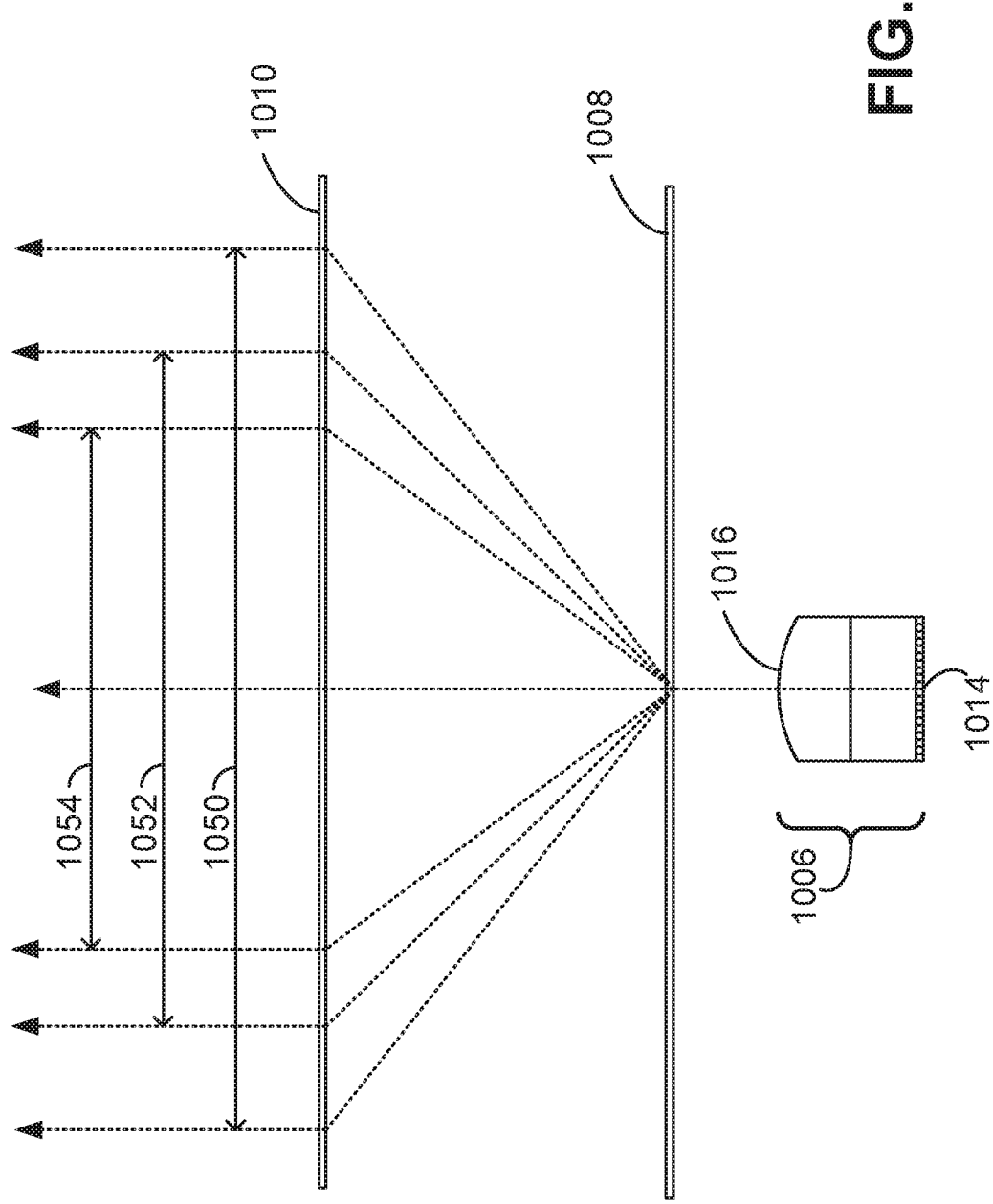

METHOD AND SYSTEM FOR APERTURE EXPANSION IN LIGHT FIELD DISPLAYS

CROSS-REFERENCE TO RELATED APPLICATION

The present application is a national stage application under 35 U.S.C. 371 of International Application No. PCT/US2018/057147, entitled METHOD AND SYSTEM FOR APERTURE EXPANSION IN LIGHT FIELD DISPLAYS, filed on Oct. 23, 2018, which non provisional filing of, and claims benefit under 35 U.S.C. § 119(e) from U.S. Provisional Patent Application Ser. No. 62/580,797 entitled "METHOD AND SYSTEM FOR APERTURE EXPANSION IN LIGHT FIELD DISPLAYS," filed Nov. 2, 2017, which is hereby incorporated by reference in its entirety.

BACKGROUND

The human mind perceives and determines depths of observed objects in part by receiving signals from muscles used to orient each eye. The brain associates the relative angular orientations of the eyes with the determined depths of focus. Correct focus cues give rise to a natural blur on objects outside of an observed focal plane and a natural dynamic parallax effect.

One type of 3D display capable of providing correct focus cues uses volumetric display techniques that can produce 3D images in true 3D space. Each "voxel" of a 3D image is located physically at the spatial position where it is supposed to be and reflects or emits light from that position toward the observers to form a real image in the eyes of viewers. The main problems with 3D volumetric displays are their low resolution, large physical size and expensive manufacturing costs. These issues make them too cumbersome to use outside of special cases e.g., product displays, museums, shows, etc.

Another type of 3D display device capable of providing correct retinal focus cues is the holographic display. Holographic displays aim to reconstruct whole light wavefronts scattered from objects in natural settings. The main problem with this technology is a lack of suitable Spatial Light Modulator (SLM) component that could be used in the creation of the extremely detailed wavefronts.

A further type of 3D display technology capable of providing natural retinal focus cues is called the Light Field (LF) display. LF display systems are designed to create so-called light fields that represent light rays travelling in space to all directions. LF systems aim to control light emissions both in spatial and angular domains, unlike conventional stereoscopic 3D displays that can basically only control the spatial domain with higher pixel densities. There are at least two different ways to create light fields.

In a first approach, parallax is created across each individual eye of the viewer producing the correct retinal blur corresponding to the 3D location of the object being viewed. This can be done by presenting multiple views per single eye.

The second approach is a multi-focal-plane approach, in which an object's image is projected to an appropriate focal plane corresponding to its 3D location. Many light field displays use one of these two approaches. The first approach is usually more suitable for a head mounted single-user device as the locations of eye pupils are much easier to determine and the eyes are closer to the display making it possible to generate the desired dense field of light rays. The second approach is better suited for displays that are located at a distance from the viewer(s) and could be used without headgear.

In current relatively low density multi-view imaging displays, the views change in a coarse stepwise fashion as the viewer moves in front of the device. This lowers the quality of 3D experience and can even cause a complete breakdown of 3D perception. In order to mitigate this problem (together with the VAC), some Super Multi View (SMV) techniques have been tested with as many as 512 views. The idea is to generate an extremely large number of views so as to make any transition between two viewpoints very smooth. If the light from at least two images from slightly different viewpoints enters the eye pupil simultaneously, a much more realistic visual experience follows. In this case, motion parallax effects resemble the natural conditions better as the brain unconsciously predicts the image change due to motion.

The SMV condition can be met by reducing the interval between two views at the correct viewing distance to a smaller value than the size of the eye pupil. At normal illumination conditions, the human pupil is generally estimated to be about 4 mm in diameter. If ambient light levels are high (e.g., in Sunlight), the diameter can be as small as 1.5 mm and in dark conditions as large as 8 mm. The maximum angular density that can be achieved with SMV displays is limited by diffraction and there is an inverse relationship between spatial resolution (pixel size) and angular resolution. Diffraction increases the angular spread of a light beam passing through an aperture and this effect needs to be taken into account in the design of very high density SMV displays.

Different existing 3D displays can be classified on the basis of their form-factors into four different categories.

Head-mounted devices (HMD) occupy less space than goggleless solutions, which also means that they can be made with smaller components and less materials making them relatively low cost. However, as head mounted VR goggles and smart glasses are single user devices, they do not allow shared experiences as naturally as goggleless solutions.

Volumetric 3D displays take space from all three spatial directions and require a lot of physical material making these systems easily heavy, expensive to manufacture and difficult to transport. Due to the heavy use of materials, the volumetric displays also tend to have small "windows" and limited field-of view (FOV).

Screen-based 3D displays typically have one large but flat component, which is the screen and a system that projects the image(s) over free space from a distance. These systems can be made more compact for transportation and they also cover much larger FOVs than e.g. volumetric displays. These systems are complex and expensive as they require projector sub-assemblies and e.g., accurate alignment between the different parts, making them best for professional use cases.

Flat form-factor 3D displays may use a lot of space in two spatial directions, but as the 3rd direction is only virtual, they are relatively easy to transport to and assemble in different environments. As the devices are flat, at least some optical components used in them are more likely to be manufactured in sheet or roll format making them relatively low cost in large volumes.

SUMMARY

In some embodiments, a display device includes a light-emitting layer having a plurality of individually-controllable light-emitting elements. The light-emitting elements may be arranged in a two-dimensional array. An optical layer comprising a plurality of collimating lenses (e.g. cylindrical lenses in a lenticular sheet, or an array of convex lenses) overlays the light-emitting layer. A first diffractive grating overlays the optical layer, and a second diffractive grating overlays the first diffractive grating. In some embodiments, a spatial light modulator such as an LCD panel overlays the second diffractive layer.

In some embodiments, the grating lines of the first and second diffractive gratings are substantially parallel, and they may have substantially the same density of line pairs.

In some embodiments, a moveable refractive layer is provided between the light-emitting layer and the optical layer.

The first and second diffractive grating surfaces may be parallel, and the separation between them may be determined based on the desired use case. In some embodiments, the first and second diffractive gratings are separated by between 0.5 mm and 5 mm. In some embodiments, the first and second diffractive gratings are separated by between 5 mm and 10 mm.

In an example method of providing a display, to generate an image, light is selectively emitted from at least one light-emitting element in a light-emitting layer that has a plurality of light-emitting elements. The emitted light is collimated, e.g. using a microlens array. The collimated light is split into a first generation of child beams using a first diffractive grating, and the first generation of child beams is split in into a second generation of child beams using a second diffractive grating. In some embodiments, at least one of the second generation of child beams having a direction different from a direction of the collimated light is blocked, e.g. by selectively rendering opaque a portion of a spatial light modulator.

BRIEF DESCRIPTION OF THE DRAWINGS

FIG. 10 is a schematic illustration of different levels of aperture expansion for different wavelengths of light.

EXAMPLE NETWORKS FOR IMPLEMENTATION OF THE EMBODIMENTS

Figure 1A:
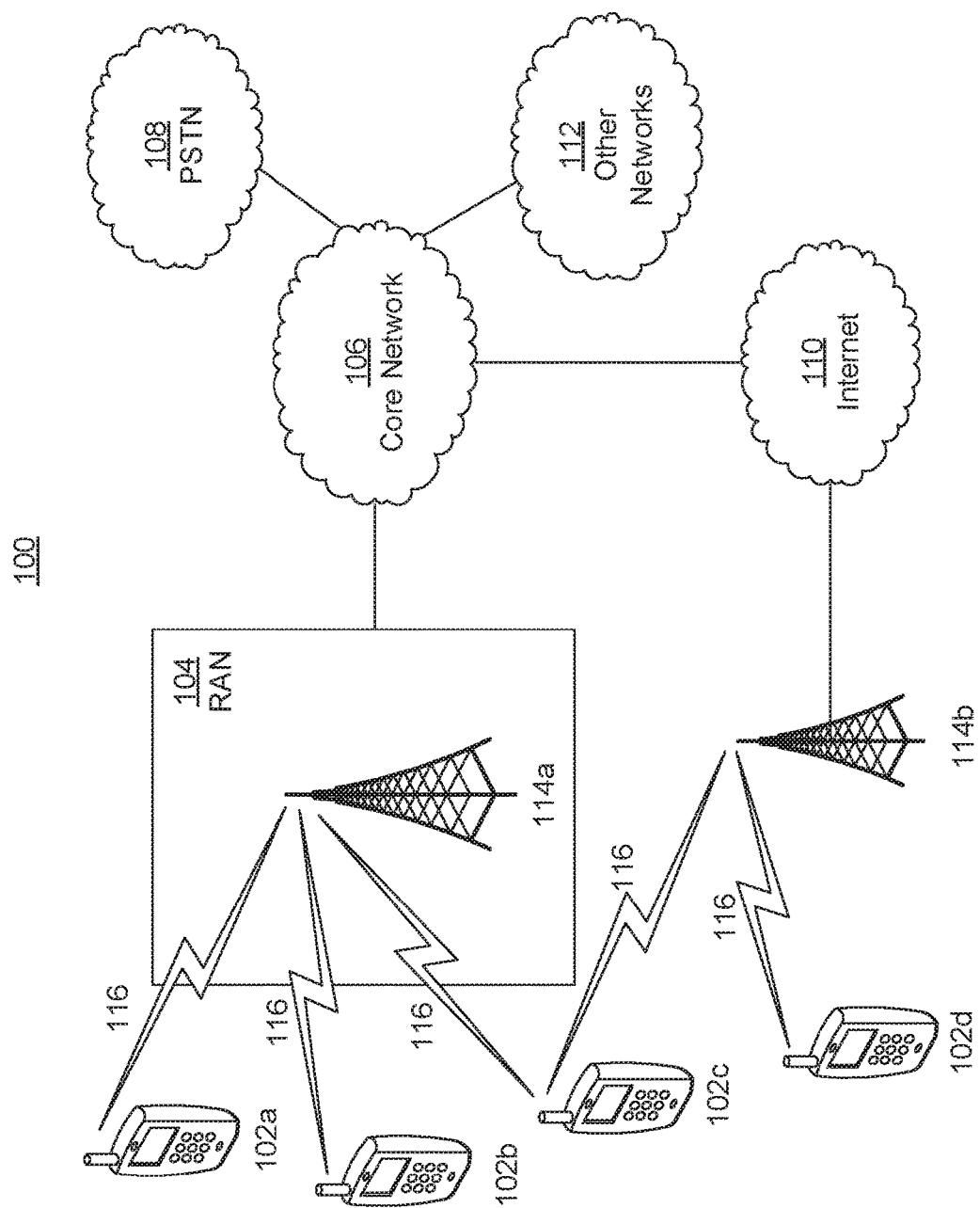
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
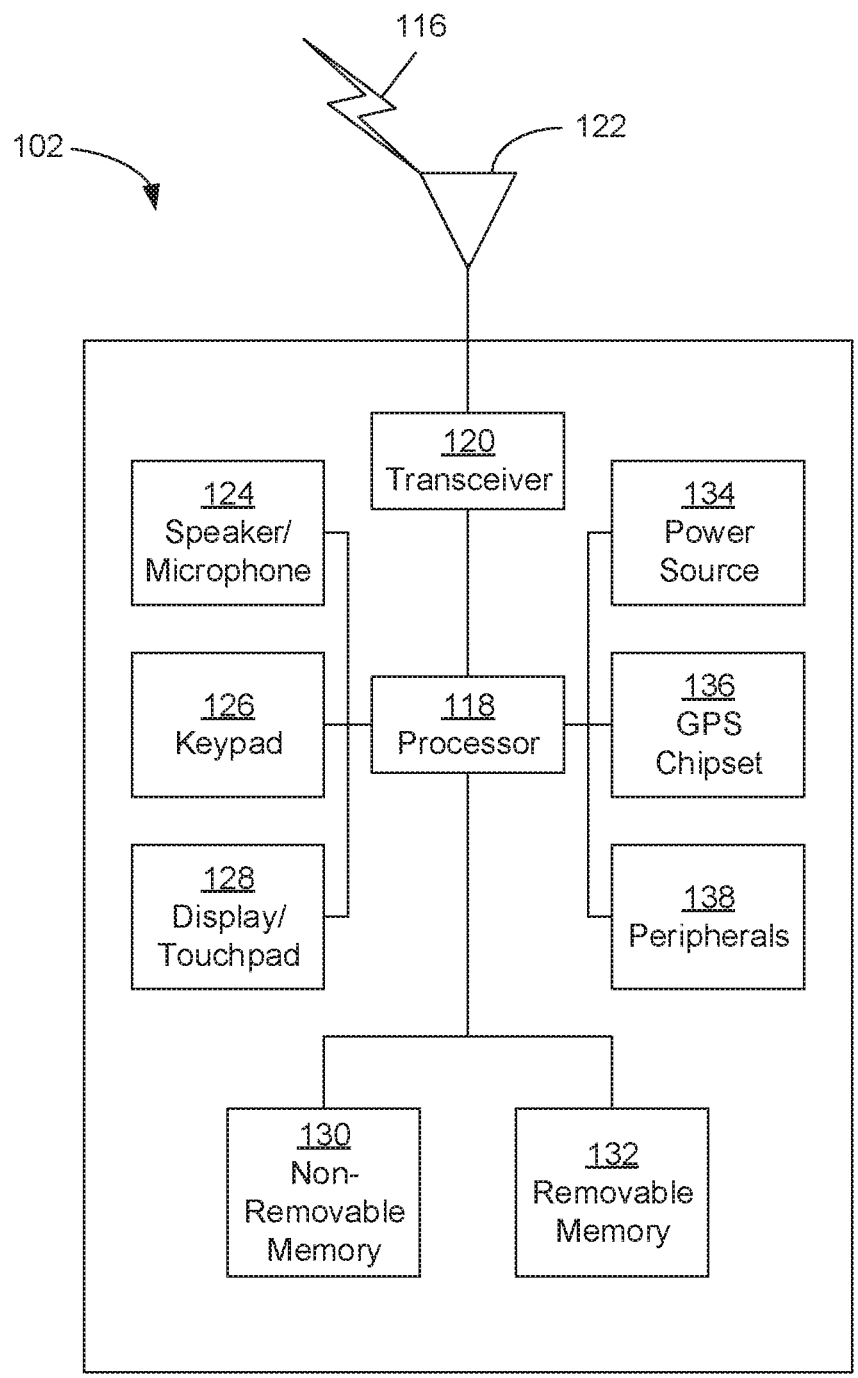
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Although the WTRU is described as a wireless terminal, it is contemplated that in certain representative embodiments that such a terminal may use (e.g., temporarily or permanently) wired communication interfaces with the communication network.

DETAILED DESCRIPTION

Abbreviations.
LF Light Field
3D Three-Dimensional
SLM Spatial Light Modulator
SMV Super Multi View
VAC Vergence-Accommodation Conflict
SVA Single-User Viewing Angle
MVA Multi-User Viewing Angle
EBA Eye-Box Angle
EBE Eye-Box Enlargement
EPE Exit Pupil Expander
Introduction.

Embodiments disclosed herein operate to improve the performance and expand the feature set of 3D LF displays based on projected beams. Systems and methods disclosed herein increase effective LF pixel aperture size using a structure that combines a grating interferometer and a spatial light modulator. The presented systems and methods expand apertures in a manner that does not necessarily affect a spatial resolution on a display surface.

In some embodiments, systems and methods for enlarging beam aperture size provide reduced diffraction effects. By taking advantage of the reduced diffraction effects provided by the enlarged apertures, a higher resolution LF display can be constructed. With the optical modulations provided by the grating interferometer and the SLM, improved spatial resolution is obtained at both the display surface and at virtual focal planes.

Furthermore, the presented processes and structures may be employed to increase a size of a 3D display eyebox. A larger eyebox may improve overall user friendliness and allows for less stringent requirements in an eye tracking system. The presented structure can be added to an existing LF display structure functioning with projected beams or used as a part of a new type of LF display.

Disclosed herein are methods and systems for increasing the aperture size of a beam-projecting LF pixel by utilizing a grating interferometer and a Spatial Light Modulator (SLM). Various embodiments take the form of an optical method. In some embodiments described herein, an enlarged aperture size allows for higher resolution LF displays through reduced diffraction effects. Systems and methods described herein make it possible to increase pixel apertures in such a way that spatial resolution on the display surface is not affected. Higher resolution images can be obtained both at the display surface and at the virtual focal planes. Alternatively, the same basic structure can be used for increasing the size of a 3D display virtual eye box, improving overall usability of the display system. The presented structures can be added on top of an existing LF display structure functioning with projected intersecting beams or used as a part of a new type of LF display.

A first part of a full LF display system disclosed herein is a LF image generation module. The LF image generation module can be any LF display that is able to make the well-collimated beams used for creating virtual focal planes at beam-intersection points. A second part of a proposed structure comprises a grating interferometer with two continuous linear gratings and an SLM. In at least one embodiment, the two gratings are identical in optical properties. The SLM may be embodied as e.g. an LCD panel and the grating interferometer may be embodied as a single polycarbonate sheet with embossed grating structures on both sides.

The first grating in the interferometer structure is used for splitting the collimated beams generated in the LF pixels into different child beams which propagate to different directions. When the child beams hit the second grating (which may be identical in optical properties to the first one), some of the second-generation child beams are diffracted back to the same direction as the original beam emitted from the LF pixel. The combined second-generation child beams interact and form a final one-directional unified beam that propagates towards a display eyebox in front of a viewers eyes. The resulting beam has a larger aperture than the original beam emitted from the LF display pixel. The SLM is positioned before or after the second grating and it is used for blocking all unnecessary diffraction orders generated by the double grating structure. The SLM reduces contrast-deteriorating crosstalk in the image.

Basic construction of an exemplary LF display taught herein is described in the balance of this detailed description. As the components in the display device are small and mass producible, the cost of such modules can be easily brought down with high volumes. Simple construction is also beneficial for the reliability, setup and calibration of the whole system, as only very few components are fitted together.

Some processes and structures disclosed in this detailed description utilize an optical aperture expander structure, which can provide one or more of the following benefits (i) lowering manufacturing and component tolerances on the optical system level, (ii) improving system ease of use by enlarging an eyebox size, and/or (iii) increasing 3D LF image spatial resolution. Each of these features can be used for enhancing the performance of LF displays that use intersecting projected beams of light to form a 3D image. In some embodiments, an exemplary optical expander structure itself may be added on top of an existing LF display structure, such as one or more of the structures disclosed in Provisional Patent Application No. 62/564,913, filed Sep. 28, 2017, entitled "Systems and Methods for Generating 3D Light Fields Using Tilting Refractive Plates," which is incorporated herein by reference in its entirety. In other embodiments, an exemplary optical expander may be used in a new LF display type.

Expanded LF pixel apertures result in larger 3D display eye boxes that in turn lower requirements for component and system-level tolerances. By lowering the system-level tolerances it is possible to build a whole display device that is a lower cost to manufacture and is easier to calibrate for different users. Cost reduction is possible because the enlarged eyebox resulting from the extended apertures allows for slower eye tracking components and less strict alignment between system modules. Furthermore, different people have natural differences in their own physical properties and common differences such as interpupillary distance variation could be handled with the presented method. In some embodiments, there would be no need for a calibration routine that would adjust the system to different users.

Example aperture expander methods described herein provide improved ease of use as there is more tolerance for the users natural eye and head movements. This is particularly useful in the case of mobile displays, which are typically in hand held devices that are not fixed to the head like HMDs. Many current mobile phones and tablets are already equipped with front facing cameras that can perform eye tracking, and as mobile devices have hard demands for low power consumption, eye tracking may be implemented in order to save energy by direct eye projection. The display views may be limited to one eye at a time in order to create the 3D image. Embodiments using eye tracking may also increase privacy as image information is projected only to the eyes of a tracked user.

The resolution of a diffraction-limited imaging system can be increased by increasing the size of the system aperture. Some aperture expander methods may enable improved spatial resolution in a LF display system through reduction of diffraction blur. Resolution enhancement may be seen in the improved pixel density of any given focal plane and/or in the increased voxel depths that would not be available without the improved beam divergence. Spatial resolution on the display surface itself may also be maintained, which is particularly useful for mobile displays that are held relatively close to the user eyes because a high resolution is called for to provide good quality pictures. Furthermore, some embodiments can emulate a regular 2D display, by allowing only the 0th order diffracted beams to pass the SLM.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment."

Moreover, any of the variations and permutations described in the ensuing paragraphs and anywhere else in this disclosure can be implemented with respect to any embodiments, including with respect to any method embodiments and with respect to any system embodiments.

General 3D Image Perception.

Figure 2A:
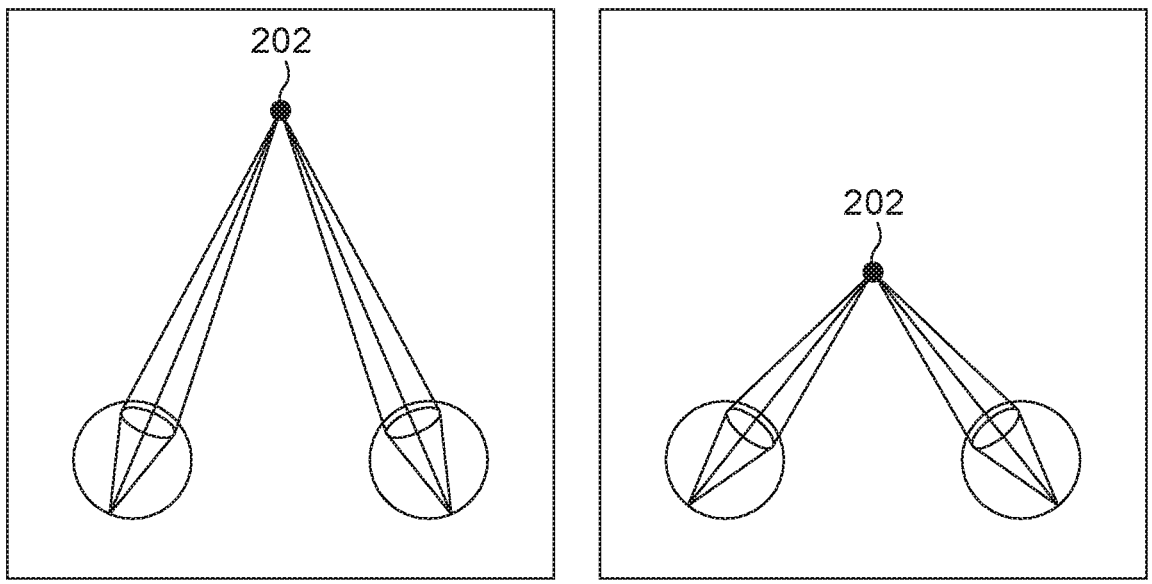
FIG. 2A depicts retinal focus when viewing a natural scene.
Figure 2B:
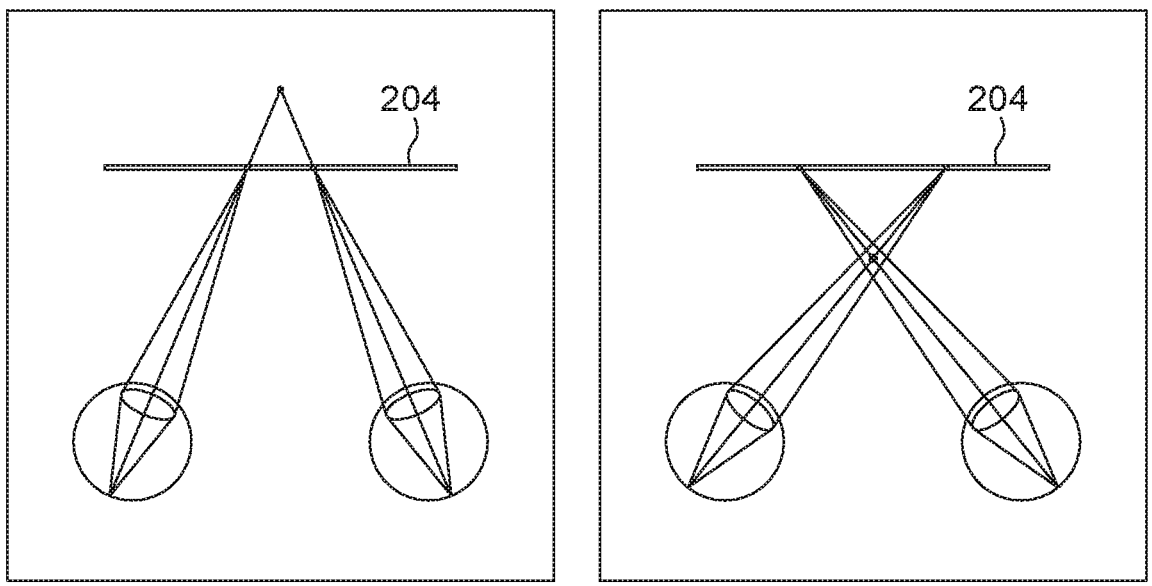
FIG. 2B depicts retinal focus when viewing an autostereoscopic 3D display.

FIGS. 2A and 2B depict different focal distances and eye convergence angles. FIG. 2A depicts retinal focus when viewing a real-world object 202 in a natural scene. FIG. 1B depicts retinal focus when viewing an autostereoscopic 3D display 204. Some parts of the image are blurred in the real-world case depicted in FIG. 2A, whereas in the case of the display depicted in FIG. 2B, all parts are in focus. Current stereoscopic displays, commonly used in home theatres and cinemas, employ suboptimal technology for making 3D images. There is a neural connection in the human brain between light sensitive cells on the eye retinas and the cells sensing eye muscle movement. The associated areas work together when a perception of depth is created. Autostereoscopic 3D displays lack correct retinal focus cues due to the fact that the image information is limited to the plane of the display. When the eyes focus to a different point than where they converge, physiological signals in the brain get mixed up. Depth cue mismatch of convergence and accommodation leads to e.g. eye strain, fatigue, nausea and slower eye accommodation to object distance. This phenomenon is called vergence-accommodation conflict (VAC) and is a result of non-proportional depth squeezing in artificial 3D images.

Figure 3A:
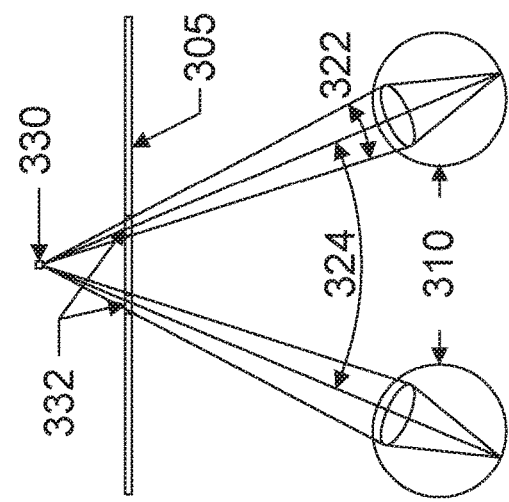
FIGS. 3A-3D depict various eye focus angles (FA) and convergence angles (CA) together with pixel clusters on a flat Light Field (LF) display.
Figure 3B:
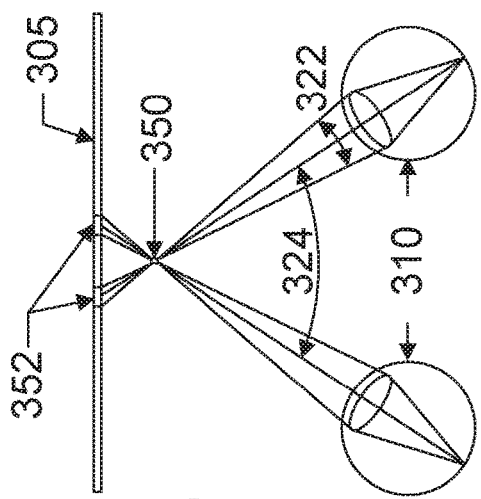
Figure 3C:
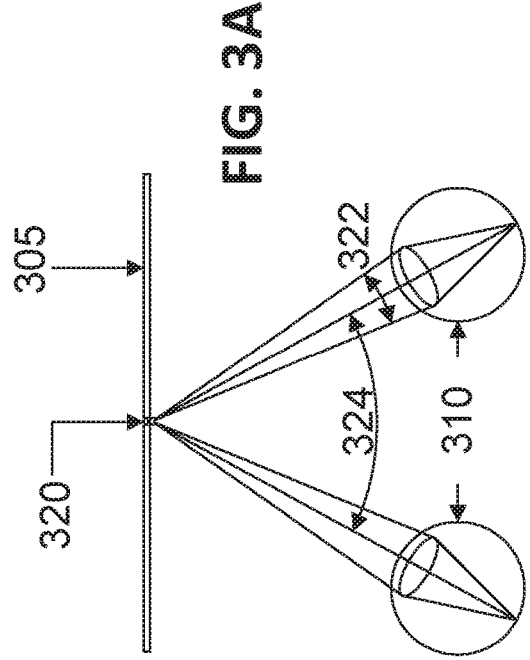
Figure 3D:
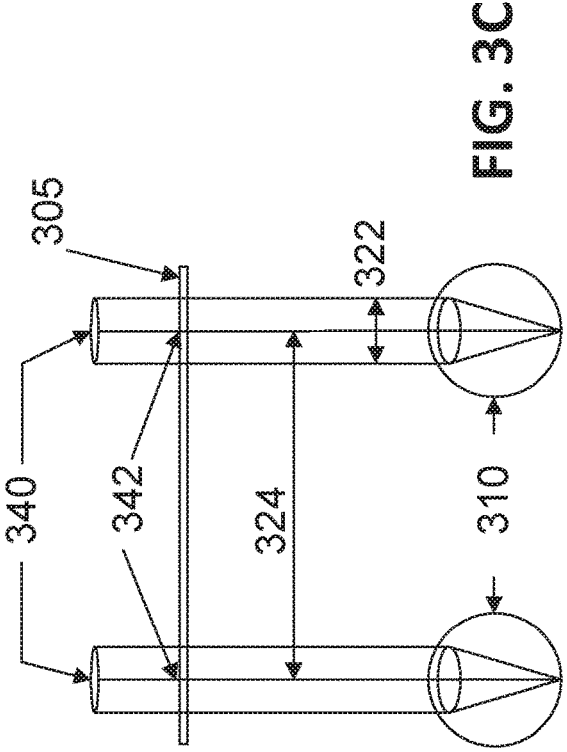

FIGS. 3A-3D depict various eye focus angles (FA) and convergence angles (CA) together with pixel clusters on a flat Light Field (LF) display. Depicted are eye focus angles and convergence angles together with pixel clusters on a flat LF display in four cases: an image point on the display surface (FIG. 3A), a virtual image point behind the display surface (FIG. 3B), a virtual image at infinite distance behind the display surface (FIG. 3C), and an image point in front of the display surface (FIG. 3D).

Vergence-accommodation conflict is one driver for moving from the current stereoscopic 3D displays to more advanced light field systems. A flat form-factor LF 3D display may produce both the eye convergence and focus angles simultaneously. FIGS. 3A-3D show these angles in four different 3D image content cases. In FIG. 3A, an image point 320 lies on the surface of the display 305, and only one illuminated pixel visible to both eyes 310 is needed. Both eyes focus (angle 322) and converge (angle 324) to the same point. In FIG. 3B, a virtual image point (e.g., voxel) 330 is behind the display 305, and two clusters of pixels 332 on the display are illuminated. In addition, the direction of the light rays from these two illuminated pixel clusters 332 are controlled such that the emitted light is visible only to the correct eye, thus enabling the eyes to converge to the same single virtual point 330. In FIG. 3C, a virtual image 340 is at an infinite distance behind the display screen 305, and only parallel light rays are emitted from the display surface from two illuminated pixel clusters 342. In this case, the minimum size for the pixel clusters 342 is the size of the eye pupil, and the size of the cluster also represents the maximum size of pixel clusters needed on the display surface. In FIG. 3D, a virtual image point (e.g., voxel) 350 is in front of the display 305, and two pixels clusters 352 are illuminated with the emitted beams crossing at the same point, where they focus. In the generalized cases of FIGS. 3B-3D, both spatial and angular control of emitted light is used from the LF display device in order to create both the convergence and focus angles for natural eye responses to the 3D image content.

At least three types of 3D displays are able to provide the correct focus cues for natural 3D image perception. The first category is volumetric display techniques that can produce 3D images in true 3D space. Each "voxel" of the 3D image is located physically at the spatial position where it is supposed to be and reflects or emits light from that position toward the observers to form a real image in the eyes of viewers. The main problems with 3D volumetric displays are low resolution, large physical size and a high complexity of the systems. They are expensive to manufacture and too cumbersome too use outside special use cases like product displays, museums etc. The second 3D display device category capable of providing correct retinal focus cues is the holographic display. These displays operate by reconstructing the whole light wavefronts scattered from objects in natural settings. One problem in this field of technology is a lack of suitable Spatial Light Modulator (SLM) components that could be used in the creation of the extremely detailed wavefronts. The third 3D display technology category capable of providing natural retinal focus cues is called the Light Field (LF) display, and it is the dominant technological domain of this disclosure.

Figure 4A:
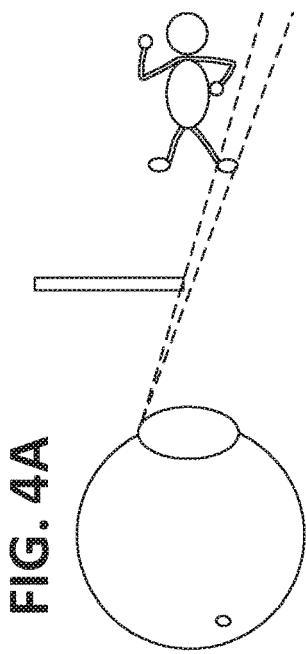
FIGS. 4A-4C depict various levels of occlusions of light fields directed towards a pupil.
Figure 4B:
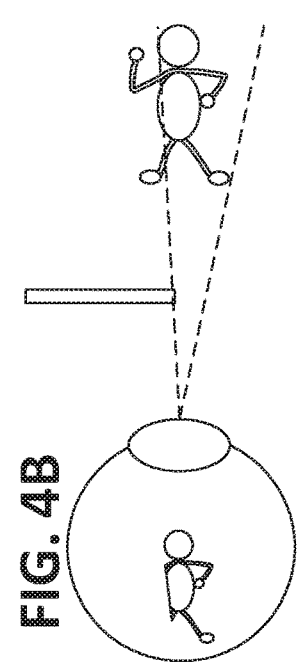
Figure 4C:
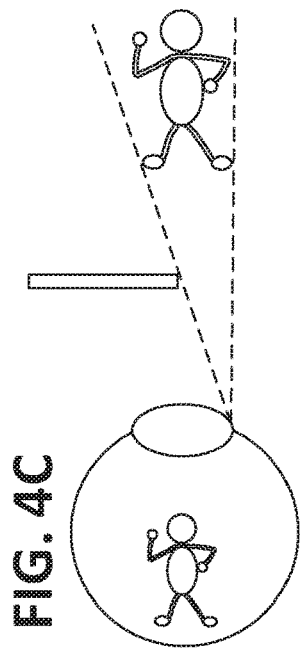

FIGS. 4A-4C depict various levels of occlusions of light fields directed towards a pupil. LF systems aim to control light emissions both in spatial and angular domains, unlike the conventional stereoscopic 3D displays that can only control the spatial domain. There are two different ways to create light fields. In a first approach, parallax is created across each eye of the viewer producing correct retinal blur corresponding to a 3D location of the object being viewed. A second approach is a multi-focal-plane approach, in which the object's image is projected to a focal plane corresponding to its 3D location. The first approach is usually more suitable to a head mounted single-user device as the location of eye pupils are much easier to determine and the eyes are closer to the display making it easier to provide the required dense field of light rays. The second approach is better suited for displays that are located at a distance from the viewer and may be used without headgear. In one embodiment of the present system, correct retinal blur is achieved by presenting multiple views per single eye. FIGS. 4A-4C show occlusions caused by parallax across the pupil. In FIG. 4A, only a portion of person's body (their foot) is visible and the rest of the person is blocked. This corresponds with a view from a left side of the pupil. In FIG. 4B, a larger portion of the person's body is visible but a small portion of the person is still blocked. This corresponds with a view from a center of the pupil. In FIG. 4C, the entirety of the person's body is visible. This corresponds with a view from a right side of the pupil. The resulting varied images represent views that could be presented in order to produce correct retinal blur. If the light from at least two images from slightly different viewpoints enters the eye pupil simultaneously, a more realistic visual experience follows. In this case, motion parallax effects better resemble natural conditions as the brain unconsciously predicts the image change due to motion. A SMV effect can be achieved by ensuring the interval between two views at the correct viewing distance is a smaller value than the size of the eye pupil.

At normal illumination conditions the human pupil is generally estimated to be around 4 mm in diameter. If the ambient light levels are high (e.g., in sunlight), the diameter can be as small as 1.5 mm and in dark conditions as large as 8 mm. The maximum angular density that can be achieved with SMV displays is limited by diffraction and there is an inverse relationship between spatial resolution (pixel size) and angular resolution. Diffraction increases the angular spread of a light beam passing through an aperture and this effect should be taken into account in the design of very high density SMV displays.

Figure 5:
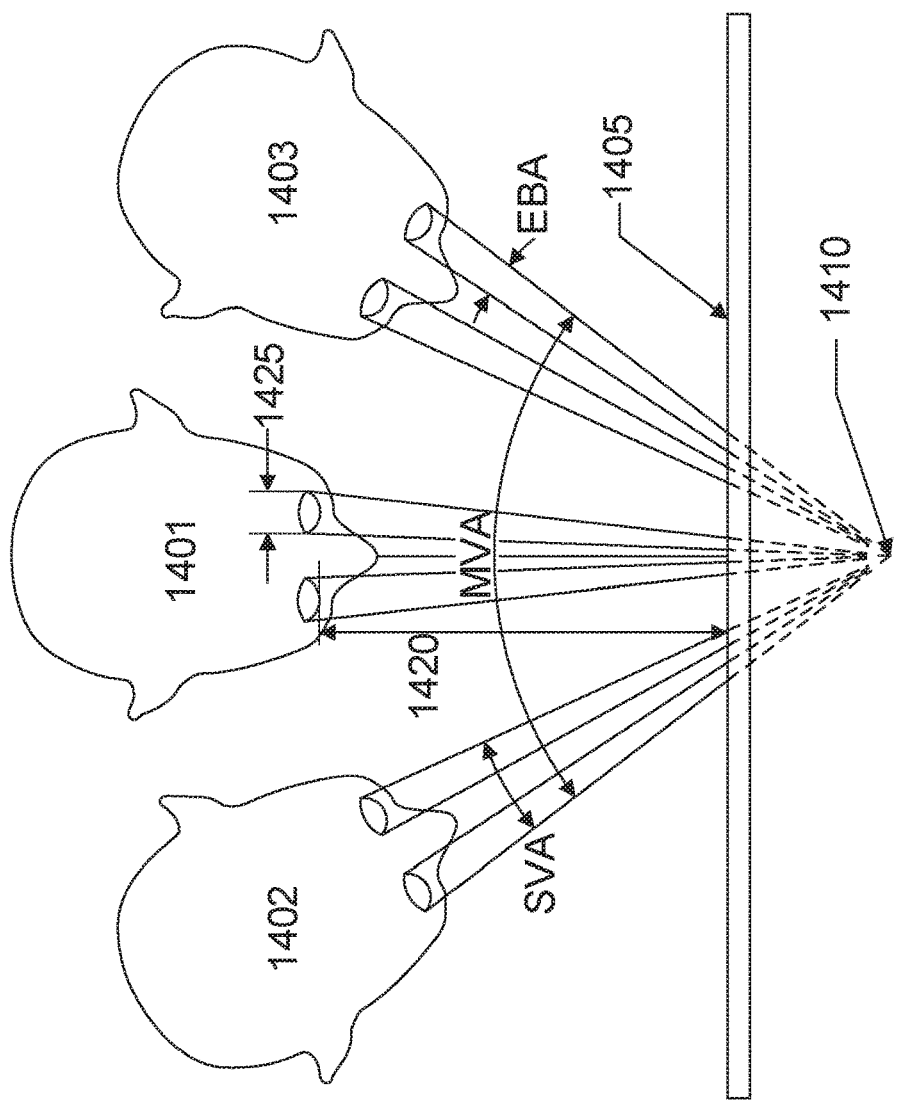
FIG. 5 depicts various light emission angles directed towards respective viewers.

FIG. 5 is a schematic view of the geometry involved in creation of the light emission angles associated with a LF display 1405 capable of producing retinal focus cues and multiple views of 3D content with a single flat form-factor panel. A single 3D display surface 1405 is preferably able to generate at least two different views to the two eyes of a single user in order to create the coarse 3D perception effect already utilized in current 3D stereoscopic displays. The brain uses these two different eye images for calculation of 3D distance based on triangulation method and interpupillary distance. This means that at least two views are preferably projected into the Single-user Viewing Angle (SVA) shown in FIG. 5. In addition, a true LF display is preferably able to project at least two different views inside a single eye pupil in order to provide the correct retinal focus cues. For optical design purposes, an "eye-box" is generally defined around the viewer eye pupil when determining the volume of space within which a viewable image is formed (e.g., "eye-box" width 1425). In the case of the LF display 1405, at least two partially overlapping views are preferably projected inside the Eye-Box Angle (EBA) covered by the eye-box at a certain viewing distance 1420. If the display 1405 is intended to be used by multiple viewers (e.g., 1401, 1402, 1403) looking at the display 1405 from different viewing angles, several views of the same 3D content (e.g., virtual object point 1410) are preferably projected to all viewers covering the whole intended Multi-user Viewing Angle (MVA).

The following paragraph provides example calculations concerning the above geometry. The values in the ensuing scenario are provided for the sake of clarity and are not meant to be limiting in any way. If the LF display is positioned at 1 m distance from a single viewer and an eye-box width is set to 10 mm, then the value for EBA would be around 0.6 degrees and at least one view of the 3D image content is generated for each ~0.3 degree angle. As the standard human interpupillary distance is around 65 mm, the SVA would be around 4.3 degrees and around 14 different views would be called for just for a single viewer positioned at the direction of the display normal (if the whole facial area of the viewer is covered). If the display is intended to be used with multiple users, all positioned inside a moderate MVA of 90 degrees, then a total of 300 different views is called for. Similar calculations for a display positioned at 30 cm distance (e.g. a mobile phone display) would result in only 90 different views needed for horizontal multiview angle of 90 degrees. And if the display is positioned 3 m away (e.g. a television screen) from the viewers, a total of 900 different views would be used to cover the same 90 degree multiview angle.

The calculations indicate that a LF multiview system is easier to create for use cases wherein the display is closer to the viewers than for those in which the users are further away. Furthermore, FIG. 5 illustrates three different angular ranges being covered simultaneously by the LF display: one for covering the pupil of a single eye, one for covering the two eyes of a single user, and one for the multiuser case. Of these three angular ranges, the latter two may be resolved by using either several light emitting pixels under a lenticular or parallax barrier structure or by using several projectors with a common screen. These techniques are suitable for the creation of relatively large light emission angles utilized in the creation of multiple views. However, these systems lack the angular resolution to address the eye pupil, which means that they are generally not capable of producing the correct retinal focus cues and are susceptible to the VAC.

A flat-panel-type multiview LF display may be based on spatial multiplexing alone. A row or matrix of light emitting pixels (LF sub-pixels) may be located behind a lenticular lens sheet (e.g. a sheet of parallel cylindrical lenses) or a microlens array (e.g. a two-dimensional array of convex lenses) and each pixel is projected to a unique view direction in front of the display structure. The more pixels there are on the light emitting layer behind each lenticular feature, the more views can be generated. This leads to a direct trade-off situation between a number of unique views generated and spatial resolution. If smaller LF pixel size is desired from the 3D display, the size of individual sub-pixels may be reduced; or alternatively, a smaller number of viewing directions may be generated. A high quality LF display has both high spatial and angular resolutions. The balance of this detailed description focuses on systems and methods for aperture expanding in an LF display device.

Optical Features Limiting the Resolution of Flat Form Factor LF Displays.

Generating a high-resolution LF image in some embodiments comprises projecting a plurality of high-resolution, depth-dependent, 2D images onto different focal planes using crossing beams. A distance between each focal plane is preferably kept inside the human visual system depth resolution. A respective position at which one of more beams intersect is called a voxel. Each beam of the voxel is tightly collimated and has a narrow diameter. Preferably, each beam waist is collocated with the position at which the beams intersect (i.e., the voxel). This helps to avoid contradicting focus cues from being received by an observer. If a beam diameter is large, a voxel formed at the beam crossing is imaged to an eye's retina as a large spot. A large divergence value indicates at least two relationships: (i) beam diameter increases as the distance between a given voxel and an observers eye becomes smaller, and (ii) virtual focal plane spatial resolution decreases as the distance between a given voxel and an observers eye becomes smaller. A native resolution at the eye increases as the distance between a given voxel and an observer's eye becomes smaller.

Figure 6B:
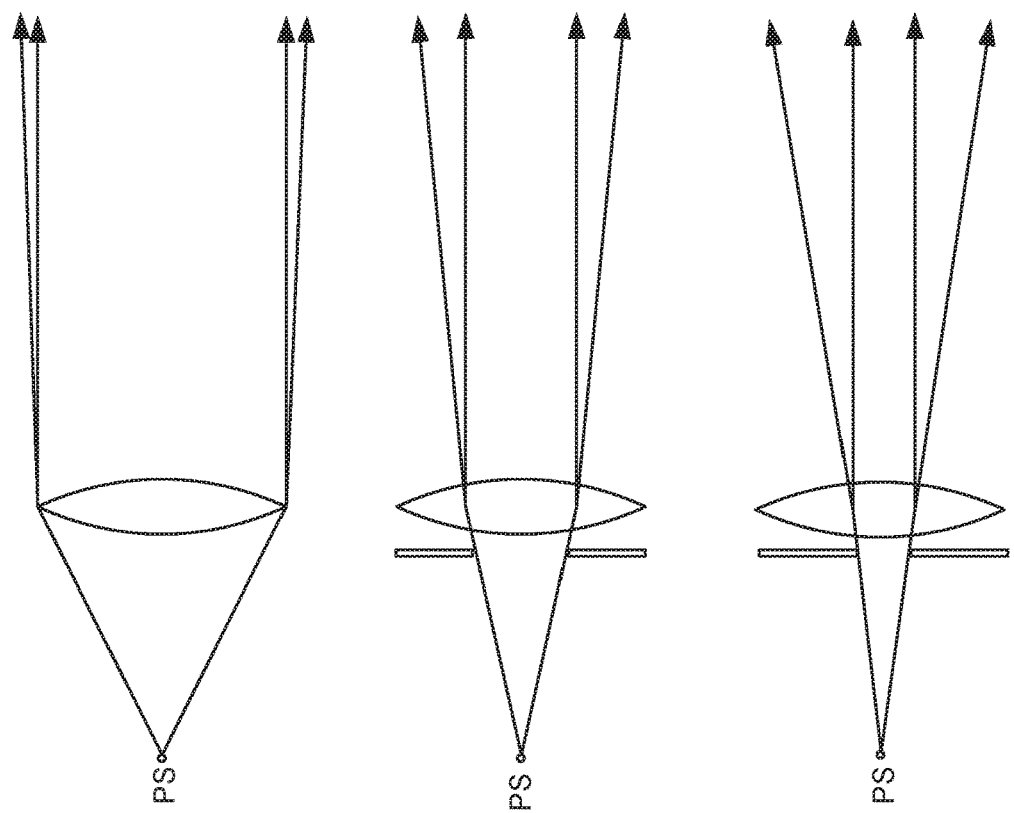
FIG. 6B depicts increasing beam divergence caused by diffraction.
Figure 6A:
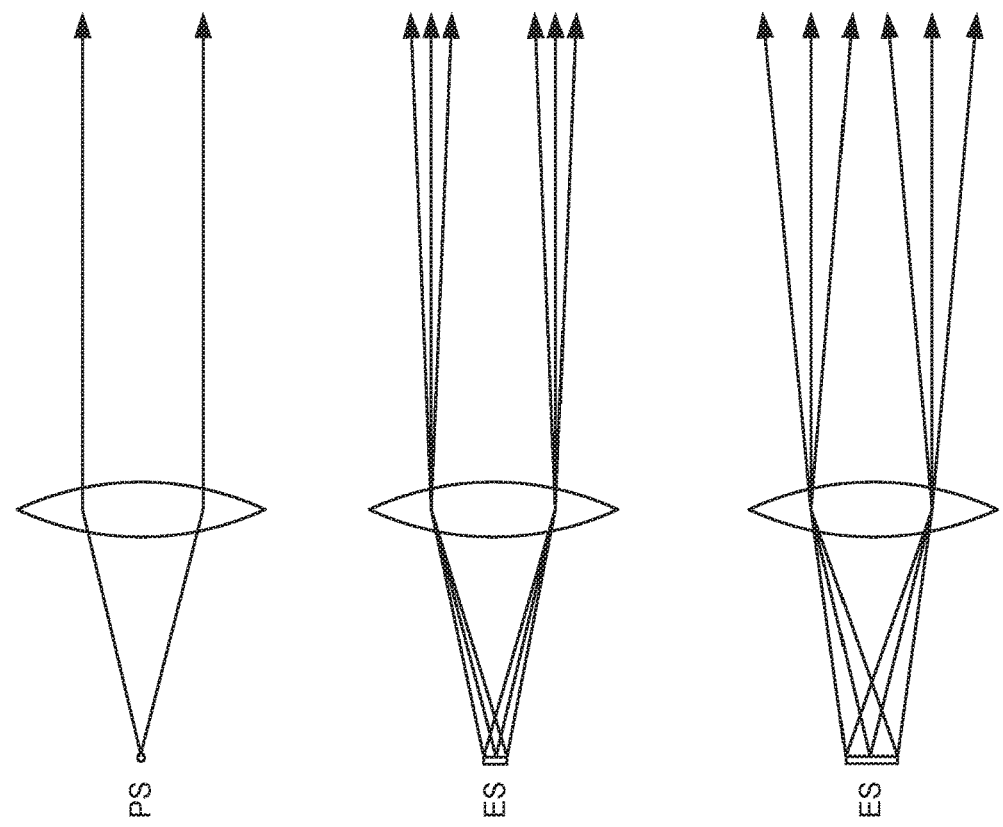
FIG. 6A depicts increasing beam divergence caused by geometric factors.

FIG. 6A depicts increasing beam divergence caused by geometric factors, whereas FIG. 6B depicts increasing beam divergence caused by diffraction. In the case of an ideal lens, achievable light beam collimation is dependent on two geometric factors: (i) a size of the light source and (ii) a focal length of the lens. Perfect collimation, that is collimation without any beam divergence, can only be achieved in a theoretical scenario in which a single color point source (PS) is positioned exactly at a focal length distance from an ideal positive lens. This case is pictured in a top-most example of FIG. 6A. Unfortunately, all real-world light sources have a non-zero surface area from which the light is emitted, making them extended sources (ES). As each point of the source is separately imaged by the lens, the total beam may be thought of as comprising a plurality of collimated sub-beams that propagate to somewhat different directions after the lens. The lower two cases presented in FIG. 6A show that as an ES grows larger, the total beam divergence increases. This geometric factor cannot be avoided with any optical means. With relatively large light sources, divergence coming from system optical geometry is a prohibitively dominating feature.

Another feature causing beam divergence is diffraction. The term refers to various phenomena that occur when a wave (e.g., of light) encounters an obstacle or a slit (e.g., in a grating). It can be thought of as the bending of light around the corners of an aperture into a region of geometric shadow. Diffraction effects can be found in all imaging systems and they cannot be removed even with a perfect lens design that is able to balance out all optical aberrations. In fact, a lens that is able to reach the highest optical quality is often called "diffraction limited" as most of the blurring remaining in the image comes from diffraction. The angular resolution achievable with a diffraction limited lens can be calculated from the formula:

$$\sin\theta = 1.22 * \lambda/D$$

where $\lambda$ is the wavelength of the light and D is the diameter of the entrance pupil of the lens. In the equation above, the color of light and lens aperture size are the primary factors that have an influence on the amount of diffraction. FIG. 6B shows that beam divergence is increased as lens aperture size is reduced. If a design is diffraction limited, it may still be possible to improve resolution by making the aperture larger. Diffraction is a primary cause of beam divergence with relatively small light sources.

As presented in FIG. 6A, the size of an extended source has a substantial effect on achievable beam divergence. The source geometry or spatial distribution is mapped by the projector lens to an angular distribution of the beam and this can be observed in a resulting "far field pattern" of the source-lens system. In practice this means that if a collimating lens is positioned at the focal distance from a source, the source is imaged to a relatively large distance from the lens. The size of the image can be ascertained from a system "magnification ratio". In the case of a simple imaging lens, this ratio is calculated by dividing the distance between the lens and image with the distance between the source and lens. If the distance between the source and lens is fixed, different image distances can be achieved by changing the optical power of the lens through adjustment of the lens curvature. But, as the image distance becomes larger (relative to the lens focal length), the required changes in lens optical power become smaller. Extreme cases approach a situation wherein the lens is effectively collimating the emitted light into a beam that has the spatial distribution of the source mapped into the angular distribution. In these cases the source image is formed without focusing.

In flat form factor goggleless LF displays, LF pixel projection lenses have very small focal lengths in order to achieve the flat structure. Typically, the beams from a single LF pixel are projected to a relatively large viewing distance. This means that the sources are effectively imaged with high magnification as the beams of light propagate to a viewer. For example: if the source size is 50 μm×50 μm, projection lens focal length is 1 mm, and viewing distance is 1 m, the resulting magnification ratio is 1000:1. Given these conditions, the source's image will be 50 mm×50 mm in size. This indicates that the single light emitter can be seen only with one eye inside this 50 mm diameter eyebox. If the source would have a diameter of 100 μm, the resulting image would be 100 mm wide and the same pixel could be visible to both eyes simultaneously—the average distance between eye pupils is only 64 mm. In the latter case, a stereoscopic 3D image would not be formed as both eyes would see the same image. The example calculation above shows how geometric parameters comprising light source size, lens focal length and viewing distance are tied to each other and effect overall performance.

As the beams of light are projected from the LF display pixels, divergence causes the beams to expand. This applies not only to the actual beam emitted from the display towards the viewer but also to any virtual beam that appears to be emitted behind the display, converging to a single virtual focal point close to the display surface. In the case of a multiview display, this can be beneficial as the divergence expands the size of the eyebox. In such embodiments, the LF system is designed such that the beam size at the viewing distance does not exceed the distance between the two eyes, as that would break the stereoscopic effect. However, when creating a voxel using two or more crossing beams on a virtual focal plane anywhere outside the display surface, the spatial resolution achievable with the beams decreases as the divergence increases. It should also be noted that if the beam size at the viewing distance is larger than the size of the eye pupil, the pupil becomes the limiting aperture of the whole optical system.

Both geometric and diffraction effects work in tandem in all optical systems. The present structure provides a means to control both geometric and diffraction effects during LF display design so as to enable a variety of solutions for voxel resolution. With very small light sources, as the optical system measurements become closer to the wavelength of light, diffraction effects start to dominate the performance of the overall LF display. Consider the geometric and diffraction effects in cases of one or two extended sources that are imaged to a fixed distance with a fixed magnification. In one scenario, a lens aperture size may be relatively small and a Geometric Image (GI) may be surrounded by blur from the Diffracted Image (DI) which is much larger. In another scenario, two extended sources are placed side-by-side and imaged with the same small-aperture lens as the previous case. Even though the GIs of both sources may be separated, it may not be possible to resolve the two source images as the diffracted images overlap. In practice, this means that reducing the light source size would not improve the achievable voxel resolution. The resulting source image size would be the same with two separate light sources as it would be with one larger source that covers the area of both separate emitters. In order to resolve the two source images as separate pixels/voxels, the aperture size of the imaging lens should be increased. In another scenario a lens with the same focal length but with a larger aperture is used for imaging the extended source. In such a scenario, the diffraction is reduced, and the DI is only slightly larger than the GI—which has remained the same as the magnification is fixed. This allows the two images to be resolved as the DIs are no longer overlapping. In general, increasing an aperture size makes it possible to use two different sources and therefore improve spatial resolution of a voxel grid.

Example Design Case Study: Real LF Display Resolution.

The ensuing section relates to a LF display design case study. The case study helps to clarify the optical requirements associated with a real LF display based on crossing beams. The study contains example calculations for image spatial resolution on intermediate 3D image focal planes between the display and the viewer. Some design parameters are changed during the study in order to provide examples of how to balance image resolution in different use cases and to discuss the different trade-offs at play.

Example system target parameters are as follows:

Display size set to 24", which simulates a regular PC desktop display.

Viewing distance set to 1 m.

LF pixel size set to 250 µm, which would mean full HD resolution (1920×1080 pixels) on the device surface.

Projection lens aperture set to 250 µm, the same as the LF pixel size.

Initial focal length of the LF pixel lens set to 1 mm.

Light emitter size set to 50 µm×50 µm, in order to reach the maximum spot size at viewing distance for a stereoscopic image.

Initial resolution calculations are as follows:

The 50 µm sized light sources are imaged to the 1 m viewing distance as 50 mm wide spots as the magnification ratio is 1000:1.

The eye sees a ~5 mm wide beam as the eye pupil limits total system aperture size.

If the virtual image plane is created at 50 mm distance from the display, the focal plane voxel width coming from crossing beams is ~490 µm and the focal plane size would be ~23". This means approximately 1000×560 pixels, which could be considered adequate.

If the same beams are used to form 3D image voxels at 500 mm distance from the display, the visible cross-section of two intersecting beams will have a width of ~2.6 mm. In this case the intermediate image plane size would be 12" and there would be only ~100×75 separate pixels on it.

The resolution achievable with such a system may not be adequate for a high-quality display image, especially in cases wherein the image voxels are close to the viewer.

One strategy for increasing the spatial resolution in the example system would be making the beams focus to the same distance as the virtual focal plane. In such a case the example system may include features such as (i) an adjustable optical power lenses (e.g. liquid lenses) and/or (ii) a controllable variable distance between the light source and lens. In either scenario, the magnification is still a limiting factor. For example, if the focal length of the LF pixel projection lens is doubled from 1 mm to 2 mm, the magnification ratio becomes 500:1 and the 50 µm source image at the viewing distance becomes 25 mm wide. Considering this is still larger than the eye pupil size, the pupil remains the limiting aperture in the system and the visible spot size at 500 mm distance virtual image plane stays the same, around 2.6 mm. In order to have e.g. 1000×560 voxel grid on this virtual image plane, the beam spot size must be ten times smaller, around 250 µm. This would call for a magnification ratio of 5:1 from the LF pixel, which would suggest a focal length of around 100 mm for the LF pixel collimator. Such a focal length together with the 250 µm lens aperture would cause large unwanted diffraction effects, making the spot much larger than the geometric image alone. This strategy would also result in losses in optical power as the angular extent of the projection lens 250 µm aperture from a 100 mm distance is small. Only an small portion of the typically Lambertian illumination distribution from the light emitting component can be used for the image formation, making the 100 mm focal length impractical.

Another potential strategy for improving the voxel resolution is reducing the size of the light emitter. If the width of the emitter in the above example is reduced from 50 µm to 5 µm, the resulting geometric spot size at the viewing distance would be around 5 mm, which is approximately the same size as the eye pupil. However, this change would still not be adequate for improving the intermediate focal plane spatial resolution as the visible beam divergence would remain the same. If the source size is reduced further, close to the practical minimum of 2 µm, the geometric spot size at the 1 m viewing distance is reduced to 2 mm and the eye pupil is no longer the limiting aperture in the system. With such sources, the 500 mm focal plane geometric voxel width would be around 1.1 mm, which is better, but still not ideal. In order to get approximately 1000×560 pixels at this intermediate focal plane, the LF pixel lens focal length may be increased to a value of around 4 mm. With this focal length the magnification ratio would be reduced to 250:1 and the geometric spot size at the intermediate image plane would be around 250 µm. Unfortunately, diffraction effects become dominating with such small sources and would blur the spot to about 1 mm size meaning no real improvement to the resolution would be achieved.

In order to remove some of the diffraction effects in the example LF display case, the projection lens diameter could be increased e.g. to 0.75 mm. This change would lower the size of the diffracted spots at the 500 mm intermediate image plane to around 330 µm and the number of resolvable pixels would be approximately 750×420. Unfortunately, the larger LF pixel aperture size would also lower the number of pixels on the display surface to about 670×380. This balanced design would be able to create a 3D picture with crossing beams inside a volume that is bounded from one end by the 24" diagonal rectangular display device and from one end by the virtual 12" diagonal rectangular focal plane. Each image plane inside this volume would have approximately VGA quality spatial resolution. By considering the average human visual system depth resolution, it is evident that the adequate number of focal planes needed in such a volume is 3, making the total number of voxels to be ~1 million. This is a reasonable number, but the achieved display resolution is now low in comparison to currently available 2D displays.

Example LF Pixel Diffraction Simulations.

In order to further clarify the effects of diffraction on a LF display's visible resolution, the following section is provided. The following section describes a set of optical simulations, performed with a pair of small light sources. In the simulation, two identical rectangular light emitting surfaces are placed side by side with a gap (pitch) that was half the width of one source. This basic source geometry remained fixed as the sizes of the sources were changed between three values: 1 µm, 2 µm and 5 µm. It should be noted that these are small values for real-life light sources, but they accurately represent feasible sizes of current visible-light-emitting optoelectronic components. For example, laser diodes can have emitter aperture sizes of around 1 µm×3 µm and µLED components can have emitter aperture sizes of 2 µm×2 µm. A plurality of µLED components may be bonded to a matrix with a 3 µm pitch, making them good real-life example light sources for this particular simulation set. Only one wavelength, red 650 nm, was used in the optical simulations, because the longest visible wavelength represents a worst case scenario.

The different optical designs in the LF pixel simulation study were created so that that the two pixels would be imaged to a 500 mm distance from the display forming a 5 mm wide illumination pattern as calculated from the geometric magnification ratio. A basic goal is to create a situation where two side-by-side pixels are imaged as separate beams into the pupil of one eye. Because the simulation is designed to show how the pixels would be visible with the naked eye, an ideal lens with 17 mm focal length was placed at the 500 mm "viewing distance". This lens simulates a functioning eye and causes the resulting illumination pattern to resemble a light distribution falling on an eye retina. As the geometric template dictates the final image size and distance, the only two optical parameters that are fixed for the different-sized sources are the LF pixel lens focal length and aperture size. In order to obtain the desired geometric magnification ratio, the focal length of the lens was set to 250 µm with the 1 µm sources, to 500 µm with the 2 µm sources and to 1250 µm with the 5 µm sources. Four different lens aperture sizes were simulated with each source size in order to see how the diffraction is affected in the different cases. F # is used as a parameter for determining correct aperture sizes in an effort to make the simulation cases comparable to each other. The F # is commonly defined as the ratio of the lens focal length to the diameter of the entrance pupil. For example, a lens that has a focal length of 500 µm and aperture size of 200 µm has F # of 2.5.

Twelve combinations were simulated, using three different source sizes and four aperture sizes for each source size. The resulting illumination distributions showed that when aperture size is increased (F # decreased), the two source images start to appear as separating spots and then as separate rectangular objects. When considering the source sizes 1 µm and 2 µm, the F #10 cases show just a single blurred spot and the resolution of the imaging system is not adequate to separate the two pixels. In these cases, the resolution is limited by diffraction and the aperture sizes are too small.

What is also evident from the results is that a minimum desirable aperture size for all sources is in the range of 200 µm-250 µm. This implies that in order to get a resolution benefit from a reduction of source size, the LF display system preferably uses LF pixel aperture sizes that are no smaller than 200 µm. This is a problematic limitation with mobile devices, as their current 2D displays have pixel densities in the range of 250 ppi-500 ppi, which translate to pixel sizes between 50 µm-100 µm. For example, a 5" mobile phone display with 200 µm pixels would have only around a 550×300 resolution display with a 125 ppi density, which is lower than e.g. the first iPhone had when it was introduced over ten years ago in 2007. Overall, the discussed simulations suggest that a flat form-factor LF display benefits from a minimum 200 µm aperture projection lens in order to benefit from the smallest scale visible light sources like µLEDs or laser diodes.

Technological Status of µLED Sources in Display Applications.

µLEDs are LED chips that are manufactured with the same basic techniques and from the same materials as standard LED chips in common use today. However, µLEDs are miniaturized versions of the commonly available LED components and they can be made as small as 1 µm-10 µm in size. Currently, a dense matrix of µLEDs can have 2 µm×2 µm chips assembled with 3 µm pitch. When compared to OLEDs, µLEDs are much more stable components and they can provide greater light intensities, which makes them useful for many applications from head mounted display systems to adaptive car headlamps (LED matrix) and TV backlights. µLEDs may be used in 3D displays to provide very dense matrices of individually addressable light emitters that can be switched on and off very fast.

One bare µLED chip can emit a specific color with spectral width of around 20-30 nm. A white source can be created by coating the chip with a layer of phosphor, which converts the light emitted by blue or UV µLEDs into a wider white light emission spectra. A full-color source can also be created by placing separate red, green and blue µLED chips side-by-side as a combination of these three primary colors generates a full color pixel when the separate color emissions are combined by the human visual system. The previously mentioned very dense matrix designed in this style may comprise self-emitting full-color pixels that have a total width below 10 µm (3×3 µm pitch).

Light extraction efficiency at the semiconductor chip is one parameter that determines electricity-to-light efficiency of µLED structures. There are several methods that aim to enhance the extraction efficiency, which is especially important with mobile devices that have a limited power supply. One such method uses a shaped plastic optical element that is integrated directly on top of a µLED chip. Due to a lower refractive index difference, integration of the plastic shape extracts more light from the chip material than in a case where the chip is surrounded by air. The plastic shape also directs the light in a way that enhances light extraction from the plastic piece and makes the emission pattern more directional. Another method comprises shaping the chip itself into a form that favors light emission angles that are more perpendicular towards the front facet of the semiconductor chip. This makes it easier for the light to escape the high refractive index material of the chip. These structures also direct the light emitted from the chip. In the latter case, the extraction efficiency can be twice as good when compared to regular µLEDs. Considerably more light is emitted to an emission cone of 30° in comparison to the standard chip Lambertian distribution wherein light is distributed more evenly to the surrounding hemisphere.

Examples of Aperture Expanders.

Many current HMD systems contain an optical module or feature called an Exit-Pupil Expander (EPE). The purpose of this component is to expand the exit pupil size of an imaging system used in combination with small micro-displays or direct retinal scanning. EPEs provide a solution for issues stemming from the natural fast eye movements (saccades) that occur when the eye scans through a FOV and provide greater flexibility in positioning of the optical system relative to the user eyes. The term generally used for an expanded exit pupil of a HMD device is eyebox. Typical eyebox sizes for large FOV systems are in the range of 10 mm-15 mm. Systems that are tightly fixed to the head (e.g. mounted on a helmet) can have smaller exit pupils as the devices do not move much in relation to the eye pupils. Systems that are not fixed to the head (e.g. mobile device displays) call for much larger eye boxes in order to allow for small head movements. This factor should be considered when designing a goggleless display that aims to project views only to the eye pupils of the user e.g. with the help of an eye tracking system. The eyebox size of projected views should be large enough to account for any user motion occurring within a time delay period between the tracking and display systems. If the eyebox is too small there is a risk of losing the 3D image as the user moves. Projected beams could miss the eye pupils and no images would be formed at the retina (or at least parts of the images would be missing). Overall, the optical module EPEs and exit pupil expansion method allow for larger tolerances in the rest of the display system making it easier to optimize the full LF display structure e.g. for cost and ease of use.

One of the main methods used for reaching good imaging resolution with an optical microscope is to design the objective lens with as large a Numerical Aperture (NA) as possible. The NA relates the microscope objective focal length to the aperture size and is similar to the F # commonly used in other fields of imaging optics. However, in this case, a larger NA value means that the relative aperture size is larger and what follows is less diffraction in a diffraction-limited lens. With microscope objectives, the focal length is usually fixed as it determines the magnification that can be obtained with the specific piece of optics; however, resolution can be improved by increasing the aperture size.

Detailed Process and Structure.

Figure 7:
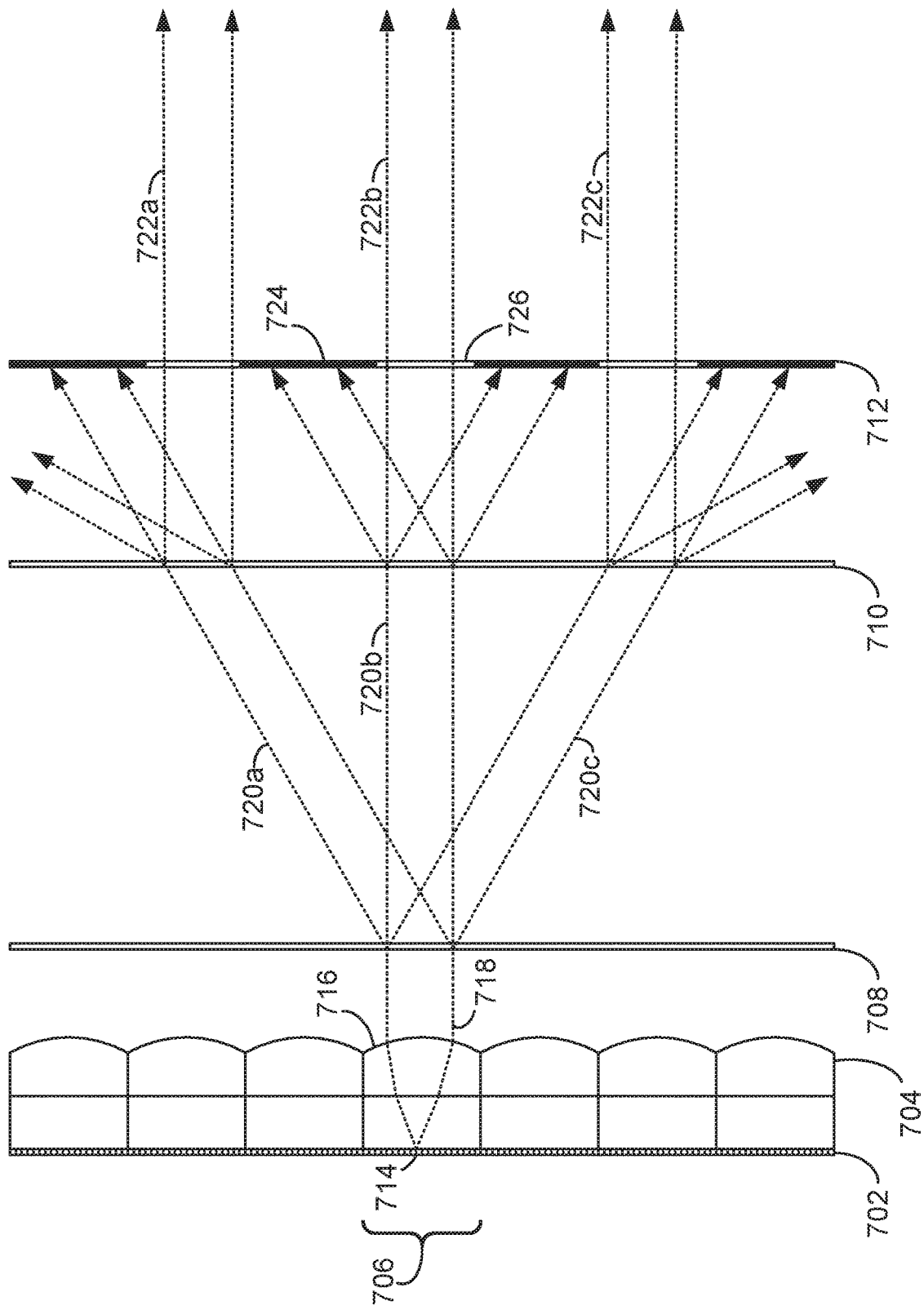
FIG. 7 is a schematic view of an example LF display structure utilizing an aperture expander, in accordance with at least one embodiment.

FIG. 7 depicts a schematic presentation of an example LF display structure utilizing an aperture expander. FIG. 7 illustrates a light emitting layer 702 with light sources and collimating optics 704. The light emitting layer has separately-controllable small emitters such as µLEDs. A projector cell such as cell 706 is embodied as a combination of the light emitting layer and a collimating lens. The display of FIG. 7 further includes a first diffraction grating 708 and second diffraction grating 710 as well as a spatial light modulator 712. In FIG. 7, one projector cell 706 from a row of identical cells is visually emphasized. Light is emitted from light-emitting element 714 of the light-emitting layer 702. The light-emitting elements in the light-emitting layer 702 may be arranged in a two-dimensional array. The lens structure (e.g. polycarbonate lenticular sheet) is overlaid on the light-emitting layer. Each lens, e.g. lens 716, collimates the light into a beam 718 that exits a single LF projector cell, forming one LF pixel. In some embodiments, inside (or in front of) the LF pixel, there may be a separate optical feature (e.g. a tilting plate) that adds temporal multiplexing to the cell structure, enabling higher beam densities by shifting the light source's virtual position with respect to the pixel optical axis. The LEL and collimator optics of the example display structure acts as an LF image generation module. The module can be any LF display engine that is able to make the well-collimated beams used for a LF display.

The aperture expander structure of FIG. 7 includes two diffraction gratings 708, 710 and an SLM 712. In particular, the aperture expander depicted in FIG. 7 comprises a grating interferometer with two continuous linear gratings and a SLM that may be, for example, an LCD panel. The gratings 708, 710 may be, e.g., nanoimprinted polymer foils or a single polycarbonate sheet with embossed grating structures on both sides. The gratings 708, 710 preferably have the same line density. The first grating 708 splits the collimated beams (such as beam 718) generated in the LF pixels into different first-generation child beams (e.g. beams 702a, 702b, 702c) that propagate to different directions according to diffraction orders. When the first-generation child beams hit the second grating 710, some second-generation child beams are diffracted back to the same direction as the original beam 718 emitted from the LF pixel, generating beams 722a, 722b, 722c.

Due to the fact that the light from a single emitter is first split and then again combined, the second-generation child beams interact in a similar way to what would be seen in a case where a single beam is expanded with the help of e.g. a common refractive beam expander lens. Because the first-generation child beams are separated spatially in between the two gratings, a resulting one-directional unified beam propagating towards the viewer after the second grating has a larger aperture than the original beam emitted from the LF display pixel. The SLM 712 is positioned before or after the second grating 710 and it is used for blocking unnecessary diffraction orders generated by the double grating structure. The opacity of different regions of the spatial light modulator may be modulated depending on the beams to be blocked. In the example of FIG. 7, for example, region 724 (among others) is opaque while region 726 (among others) is transparent. The spatial light modulator helps to reduce contrast deteriorating crosstalk in the image. Not all of the higher orders need to be blocked as most of them propagate to directions outside the intended display FOV. In some embodiments and/or modes of operation, a display may transmit only zeroth order beams and thus the structure may act as an ordinary 2D display.

Figure 8:
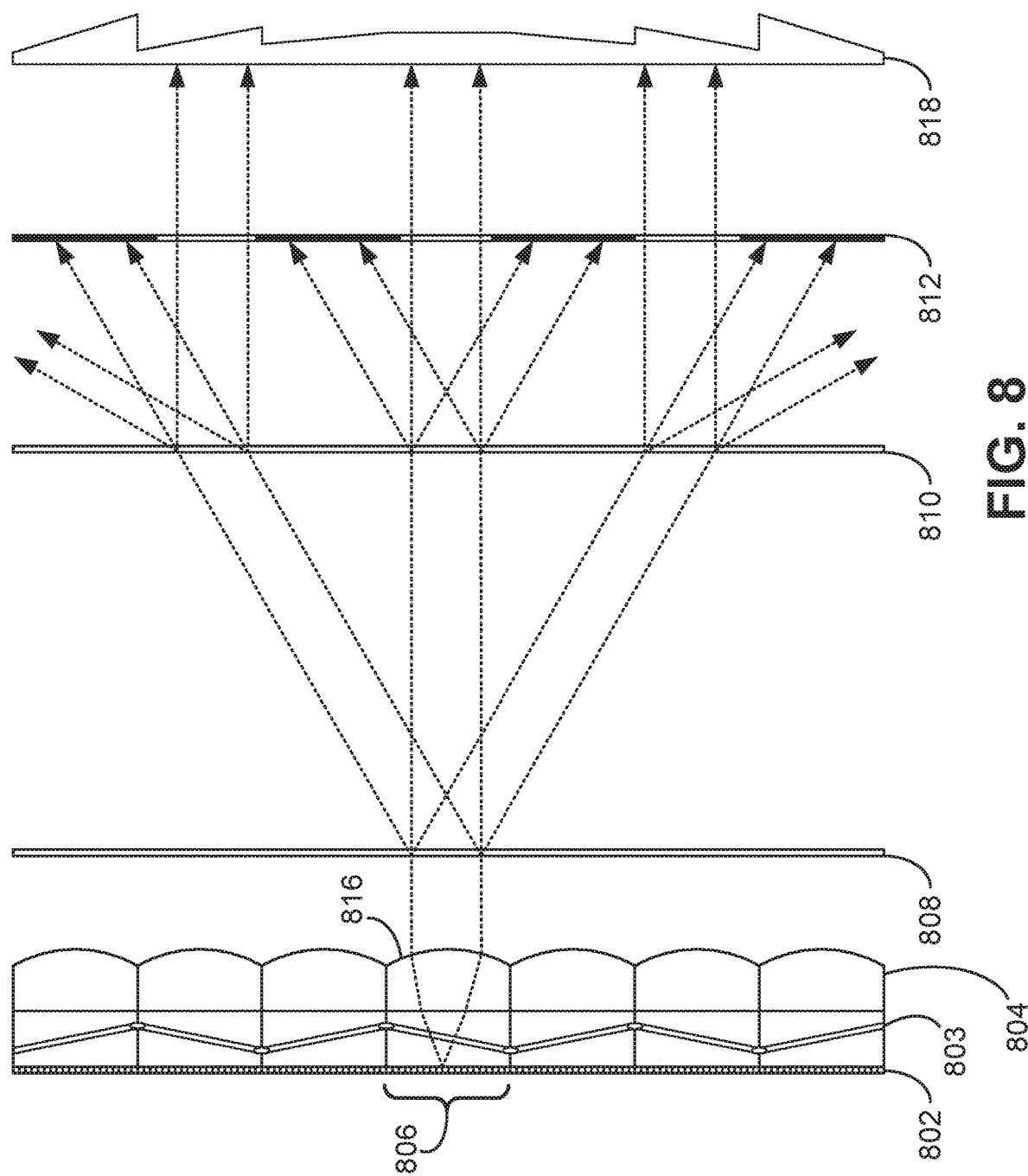
FIG. 8 is a schematic view of an example LF display structure utilizing an aperture expander, in accordance with at least one embodiment.

FIG. 8 depicts a schematic presentation of another example LF display structure utilizing an aperture expander. FIG. 8 illustrates a light emitting layer 802, a layer 803 of tilting transparent plates, and collimating optics 804, together forming a projector cell 806. The display of FIG. 8 further comprises a first diffraction grating 808 and second diffraction grating 810 as well as a spatial light modulator 812. The moveable refractive layer 803 of tilting transparent plates may be used to add temporal multiplexing to the cell structure, enabling higher beam densities by shifting the light source's virtual position with respect to the pixel optical axis. The plates may be driven in an oscillating or other controlled manner, e.g. by generating a standing wave or traveling wave in the plates. In some embodiments, optical elements other than the tilting plates of layer 803, such as an oscillating transparent film, may be used to provide temporal multiplexing. In some embodiments, a component such as Fresnel lens 818 may be used to direct light beams toward a desired viewing region.

Figure 9:
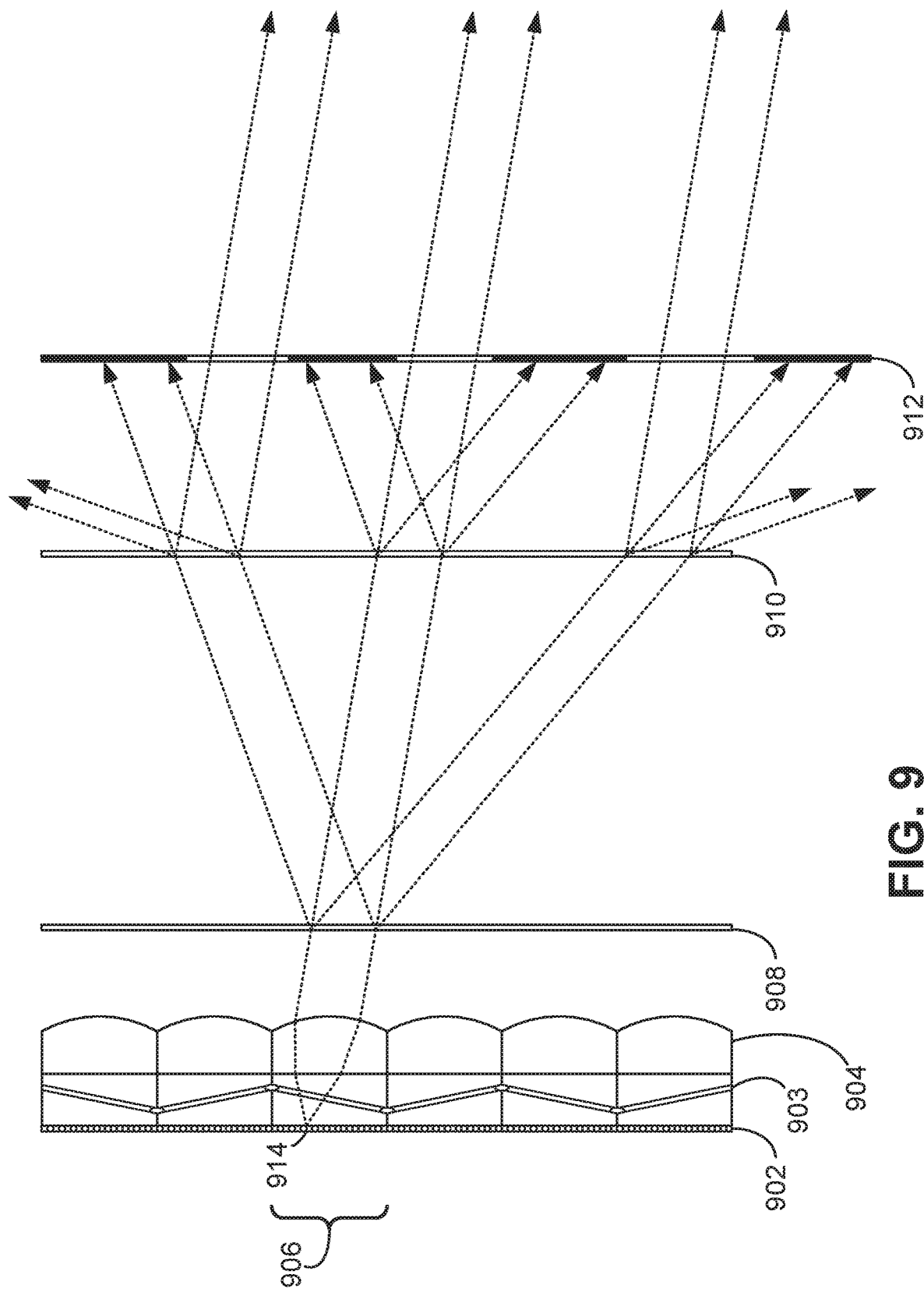
FIG. 9 is a schematic view of an example LF display structure utilizing an aperture expander, in accordance with at least one embodiment.

As illustrated in FIG. 9, the direction of emitted beams maybe controlled by which light-emitting element is illuminated within a projector cell. In the structure of FIG. 9, light-emitting element 914 of light-emitting layer 902 is illuminated within projector cell 906. The virtual position of light-emitting element 914 may be modulated by tilting plates 903. The light from light-emitting element 914 is collimated by collimating optics 904, and the resulting collimated beam is passed through first diffraction grating 908, second diffraction grating 910, and spatial light modulator 912. Appropriate regions of spatial light modulator 912 are rendered transparent to allow passage of the desired beams, while other regions are rendered opaque to block undesired beams.

It should be noted that more than one light emitter may be activated simultaneously inside one LF display pixel (such as projector cell 706, 806, or 906). When emitting light from more than one light source, the spatially separated emitters generate a series of collimated beams that hit the first grating at different angles. In certain embodiments, in addition to this spatial multiplexing, the number of view directions is increased by utilizing e.g. the tilting plate structure (such as structure 803 or 903) and temporal multiplexing. Sets of first- and second-generation child beams are created by diffraction gratings, and each directional beam is expanded in the same way in the structure. The SLM (such as structure 712, 812, or 912) is used for selectively blocking the unnecessary directions and orders according to image content. With such a structure, each LF pixel is able to generate a plurality of beam directions usable for creating voxels in the form of beam crossings at virtual focal planes. In some embodiments, each directional beam may be either blocked or its aperture size enlarged or reduced. Aperture reduction is used in some embodiments to increase diffraction blur in order to e.g. diffuse pixel boundaries or to create a blurred image effect.

Because the angular control of the gratings is continuous, the LF pixels (such as projector cells 706, 806, 906) may be positioned side-by-side behind the grating interferometer structure with a pitch that is smaller than the widths of the expanded beams. This results in an expansion of beam apertures even though the original display spatial resolution (as determined by LF pixel projection lens aperture size) remains constant. Different projector cells may be used for producing different beam directions simultaneously and light emission timings may be synchronized with the SLM in order to show the different pixels at different time intervals. In such embodiments, the components used on the light emitting layer (e.g. μLEDs) are modulated faster than the SLM (e.g. LCD) and the emitters can be turned on and off several times inside one refresh cycle of the SLM. This structure and process helps to mitigate crosstalk between LF pixels.

While FIGS. 7, 8, and 9 illustrate a cross-section of light field display structures including projector cells arranged in a row, it should be understood that, in most embodiments, the projector cells are arranged in a two-dimensional array, with a two-dimensional array of light-emitting elements within each projector cell.

In various embodiments, the desired SLM functionality is obtained using an LCD panel. If the light emitting pixels (e.g. μLEDs) are modulated separately from the SLM then the SLM may be implemented using pixels with binary on-off functionality. In some embodiments, however, the LCD panel is used for the pixel intensity modulation along with or instead of the light emitting layer. In some embodiments, the SLM is a black-and-transparent panel which modulates tri-color light emitting pixels. In other embodiments, the light emitting pixels generate only white light and the SLM is used for color filtering. An operational switching speed of the SLM to reach flicker free images of around 60 Hz is feasible. In some embodiments, a majority of 3D image generation is done with a much faster LF display module located before the aperture expander structure. In some embodiments, the SLM is only used for passing or blocking beams that are selected by a LF display control module to reach a viewers eyes. In some embodiments, the SLM and light emitting layer controls are connected and synchronized, but as stated previously, currently available LCD panel refresh rates are adequate for this purpose.

The added beam expander structure, especially the SLM, may increase a complexity of (i) a rendering methodology and (ii) pixel modulation controls, used for the creation of a 3D image. In some embodiments, the SLM is synchronized to light emitting pixels and image content. In various embodiments, the SLM provides a final selection of blocked and passed beam directions.

In some embodiments, the SLM modulation is based on current user view direction(s) e.g., determined with an active eye tracking module. Processing demands of rendering may be reduced by grouping the light emitting layer and SLM pixels such that an image is displayed as interlaced instead of as successive single pixels. A number of pixels included in one group is determined by the light emitting pixel size and pitch, SLM pixel size, and a size of an expanded beam aperture, controlled with the SLM.

An aperture expander as disclosed herein may operate to reduce diffraction effects, making it possible to improve beam divergence and voxel spatial resolution. Improving voxel spatial resolution is a first use case for the aperture expander. However, in some cases, the beam expander described in this detailed description is used for making a larger eyebox for the LF display. These two different use cases imply that various parameters of the expander structure may be selected to better suit one goal or the other. The aperture size of the beam exiting the second grating and SLM can be adjusted by changing (i) a distance between the two gratings and (ii) a grating period that determines the child-beam angles. In at least one embodiment, the gratings are configured to distribute the optical power evenly to only three orders that are: −1, 0 and +1. In other embodiments, higher orders are also utilized e.g., to facilitate a larger beam expansion ratio. In use cases wherein higher voxel spatial resolution is targeted, a smaller expansion ratio is tolerated and the distance between the two gratings is kept relatively small (e.g., under a1 mm). In use cases wherein the goal is to increase eye box size, the eye pupil determines a desired beam expansion and the distance between the gratings is increased to a few millimeters. A performance trade-off relationship exists between the various structural implementations. Therefore, desired LF display characteristics should be considered when designing a real-world system. In at least one embodiment, the distance between the two grating is adjustable and controllable across a certain range (e.g., from 0.1 mm to 5 mm with a 0.1 mm step size).

It should be noted that the presented structure causes some light losses due to the fact that some of the diffraction orders generated in the second grating will be either blocked by the SLM or lost outside the display FOV. In embodiments wherein only three orders are generated in both gratings, the transmission power is in the range of ⅓ of the emitted light. However, embodiments disclosed herein may show higher quality 3D images that have a larger range of depths than could be shown using a structure without an aperture expander. Without an aperture expander, the diffraction would limit the achievable beam divergence. This applies especially to distant focus layers as they call for tight beam collimation and also to small scale LF displays which use small projection lens apertures in order to help maintain adequate spatial resolution on the display surface. Embodiments designed to increase eyebox size are often well suited for small displays found in hand held devices because these displays are not steadily fixed with respect to a viewer eyes. In these cases, multiview image pixels are visible inside an expanded eyebox, lowering the demands for alignment systems e.g. an eye tracking system.

Diffractive components, such as the gratings, separate colors as different wavelengths are diffracted to somewhat different angles. In many embodiments, the two grating have the same optical properties (e.g., the same groove spacing) forming a matched double grating structure. One benefit of the matched double grating structure is the fact that the second identical grating exactly compensates the beam propagation angles produced by the first identical grating. Therefore, all beams generated at the same LF pixel position, even beams having different colors, will propagate to the same direction and with the same divergence after the second grating. However, as the diffraction angles are different, red beams will be wider than green beams which will be wider than blue beams. This separation has many benefits. One useful property of the presented double grating relates to the fact that diffraction effects are more severe with longer wavelengths. The fact that red beams are made wider by the double grating structure is optically useful, as red beams also need wider apertures to compensate for increased diffraction blur.

FIG. 10 depicts an example structure in operation with various parameters related to color separation. In the scenario depicted in FIG. 12, a 250 µm wide collimator lens is used in a LF pixel 1006 with small red (650 nm), green (550 nm) and blue (450 nm) sources positioned at the same point 1014 under the lens. Two thin grating structures 1008, 1010 positioned above the LF pixel are a 1 mm distance from each other and their grating line density is 1000 lp/mm (line pairs per mm). The grating lines of the grating structures are substantially parallel to one another. As shown in FIG. 10, the beam's zeroth orders propagate through both gratings along the direction of the optical axis as one beam around 250 µm wide that comprises all three colors. (For clarity of illustration, only the beam centerlines are shown in FIG. 10.) The −1 and +1 orders are split from the central beam at the first grating 1008, and different colors are bent at different angles. In the second grating 1010, the −1 order first-generation child beams are diffracted again, and the +1 order second-generation child beams are turned back to the original direction of the LF pixel beam. An analogous process occurs with the +1 order child beams, but the used diffraction order in the second grating is now −1. (Other diffracted beams are not illustrated in FIG. 10.) After the second grating 1010, the total aperture width 1050 of the red beam is 1.7 mm, the total aperture width 1052 of the green beam is 1.3 mm, and the total aperture width 1054 of the blue beam is 1.0 mm.

Example Use Cases.

In the ensuing paragraphs, use cases for beam expander methods and structures are presented. A first case presents a mobile multiview display, in which the method is used for exit pupil expansion (EPE). A second case presents a desktop display structure wherein the method increases voxel spatial resolution of a light field display with crossing beams.

Mobile 10" Multiview Display with EPE.

Figure 11A:
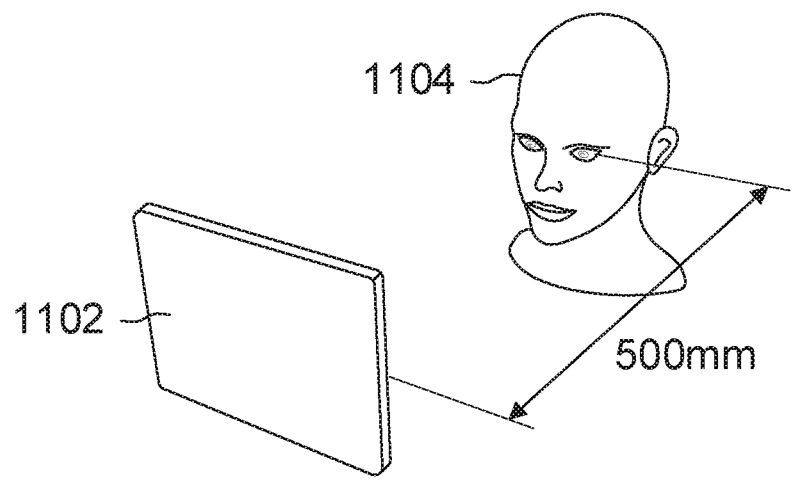
FIGS. 11A-11B are schematic perspective views of a display device using an aperture expander according to some embodiments.
Figure 11B:
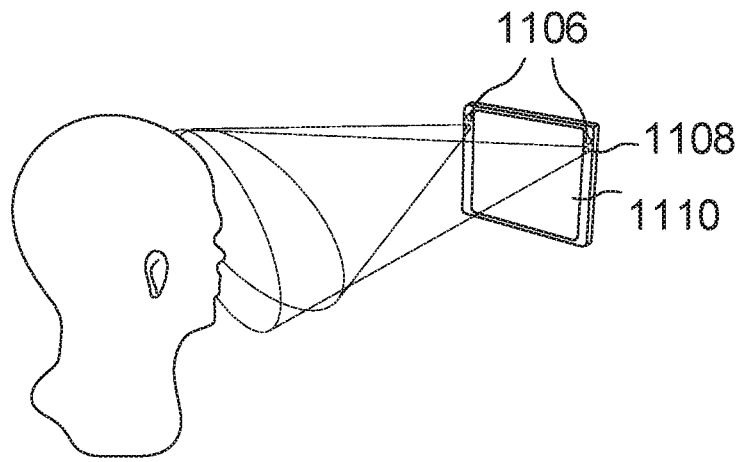

FIGS. 11A and 11B depict a first real-world example scenario highlighting EPE improvements provided by the presented LF display structure. In particular, FIG. 11A shows a first view of an example viewing scenario and FIG. 11B shows a second view of the same example viewing scenario. In the example viewing scenario, a tablet device 1102 with a flat or curved 10" multiview 3D screen 1110 is placed at a 500 mm distance from a single viewer 1104. The tablet device comprises a stereoscopic camera pair 1106 and IR LEDs 1108 that illuminate the facial area of the viewer. The cameras and IR LEDs provide accurate eye tracking that is capable of determining 3D locations of the viewers pupils as well as, in some embodiments, a direction of gaze. In at least one embodiment, projecting a stereoscopic 3D image using the tablet device comprises using the 3D locations of the viewer's pupils (and in some embodiments the direction of gaze) for projecting the stereoscopic 3D image to the eye directions only. These embodiments save energy as light is only directed to the eye pupils instead of a whole surrounding space. Furthermore, in such an embodiment, there is at least one more benefit in the form of a reduction of the amount of information that needs to be processed for image data rendering.

One example of a configuration of an LF display structure with a beam expander designed for EPE is described with respect to FIG. 7. The display may be a 10" LF display based on a combination of spatial and temporal multiplexing. Spatial multiplexing is accomplished using a two-dimensional µLED matrix or array. In some variations, temporal multiplexing is done e.g., using a tilting plate array (similar to array 803), as disclosed in Application No. 62/564,913, referenced above. The light emitting layer 702 includes 5 µm×5 µm sized µLEDs that are positioned in a row with a 7 µm pitch. Each projection cell 706 forms a 100 µm wide LF pixel. A total number of µLEDs on each horizontal row inside each LF pixels is fourteen and the outermost components of each pixel are at a 45.5 µm distance from the LF pixel center. An aperture size of the projection lens 716 is 100 µm and the focal length is 400 µm corresponding to a F #4.0 optical system. A viewing distance from the mobile display is 500 mm. The geometric magnification ratio is 1250:1, which results in the source geometric image width at the eye pupils being 6.25 mm. The outermost µLEDs in the row are imaged at around a 60 mm distance from the centerline, creating a viewing window that is around 120 mm wide for each LF pixel. In order to keep all of the pixels visible throughout the entire surface, the display may be curved in the horizontal direction, making all separate LF pixel viewing windows overlap and form a common viewing area. The pixel µLED columns are able to project fourteen different views inside this area. In the present example, the LF pixel projection lenses are cylindrical, which means that there is no optical power in the vertical direction. (Such cylindrical lenses are examples of collimating lenses as they collimate light along at least one dimension.) It follows that the µLED natural divergence is maintained through the optical stack and pixels are visible inside the vertical FOV determined by the µLED numerical aperture. In this example, layer 703 is a 50 µm thick polystyrene tilting plate foil used to scan horizontal directions of the µLED virtual positions. This results in the projected beams being scanned over a 4 mm pupil width at this viewing distance when using a maximum plate tilt of ±7°. This range is capable of filling all projection angles between two adjacent µLEDs on the matrix, making the present example a very dense LF multiview display.

The beam expander layer positioned above the LF pixel matrix has two 76.5 μm thick polystyrene grating foils 708, 710, each with 1000 lp/rm. The foils are positioned at a 6.2 mm distance from each other. The grating interferometer splits the original beam into three parts. The light intensities of the three parts may have substantially equal light intensities depending on the optical properties of the grating foils. After passing through the grating foils, the distance between right and left side child beams (722a, 722c) becomes approximately 9 mm. At the display surface, the separate child beams have a diameter of around 300 μm. An LCD panel 712 with approximately 300 μm pixels (fitted to the beam size) without color filters is positioned on top of the beam expander in order to block out unnecessary diffraction orders. Divergence resulting from the combination of geometric and diffraction effects makes the beams exiting the provided EPE structure partially overlap at the 500 mm viewing distance, forming an eye box for a single μLED that has a width of approximately 15 mm. This shows that the single μLED eyebox has been widened from around 6.25 mm to around 15 mm by using the beam expander, making it easier to project the single LF sub-pixel images to the eye pupils.

Figure 13:
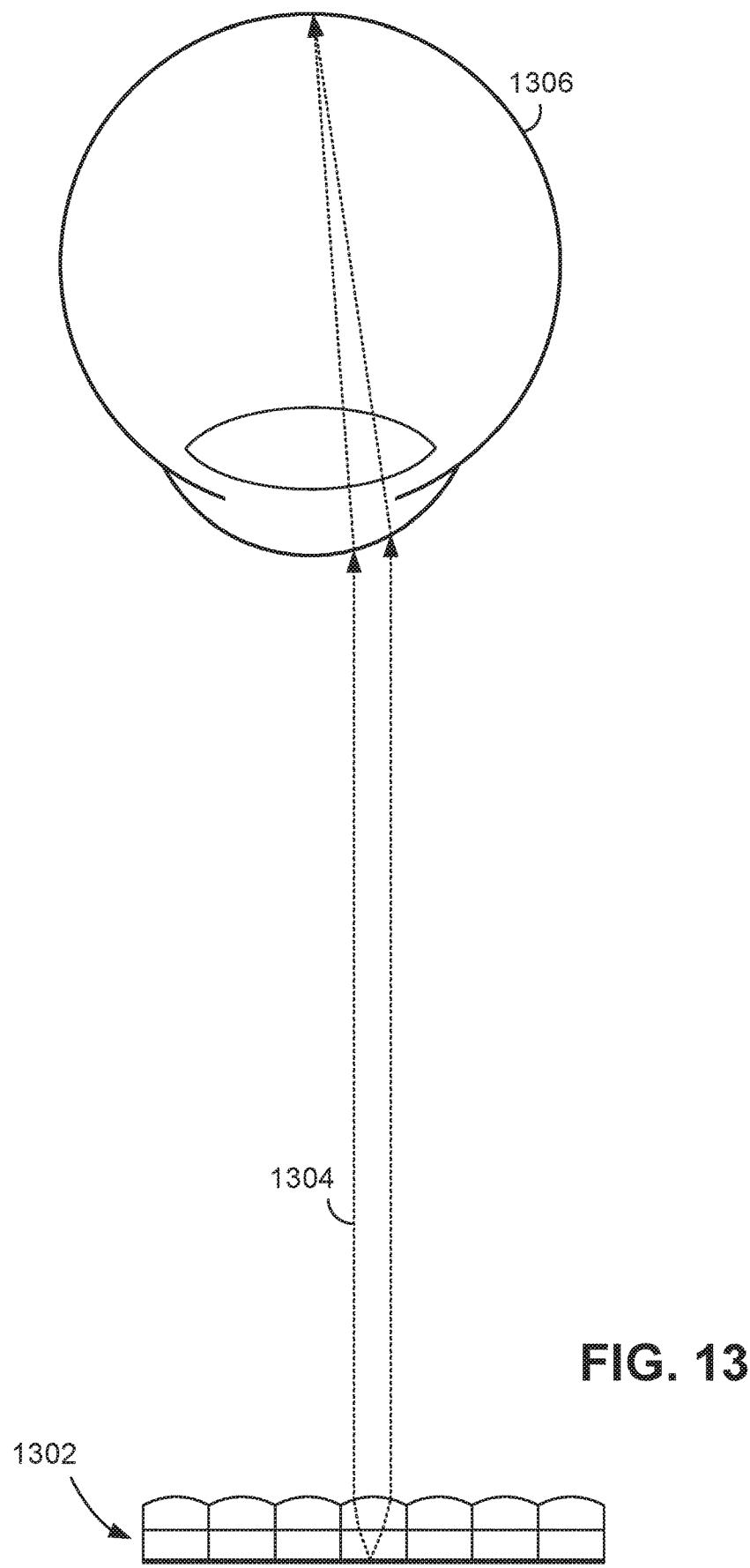
FIG. 13 is a schematic view of a light field display implemented without an aperture expander.
Figure 14:
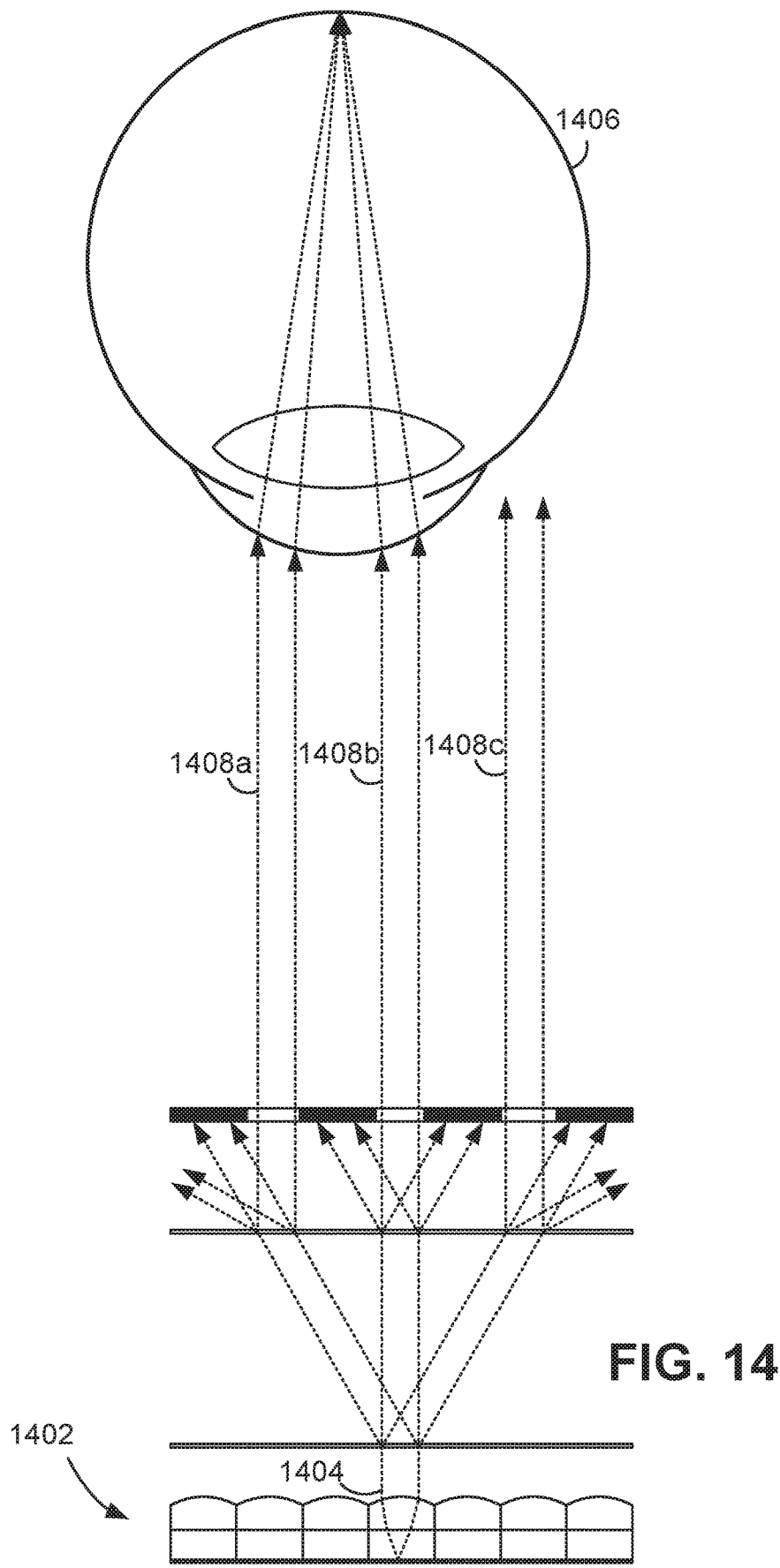
FIG. 14 is a schematic view of a light field display implemented with an aperture expander according to some embodiments.

One benefit of exit pupil expansion is schematically illustrated with respect to FIGS. 13 and 14. FIG. 13 illustrates a light field display 1302 directing a beam 1304 toward the eye 1306 of a user. Light field display 1302 is not equipped with any aperture expansion feature. As a result, if the viewer were to move slightly to the left of the page, beam 1304 would no longer be visible to the user's eye 1306. On the other hand, FIG. 14 illustrates a light field display 1402 that is equipped with an aperture expander. As a result, instead of a single, narrow beam 1404 directed toward the user's eye 1406, three beams 1408a-c are directed toward the user's eye. This allows the user greater freedom to move to the left or right while the light from the display remains visible. Note in this embodiment that the separate beams 1408a, 1408b are parallel and focus to the same point in the users eye while the eye is focused at infinity; as a result, the user may experience little to no change in the appearance of the display during eye movements, even though there are gaps between the beams.

Desktop 24" Real LF Display with Improved Voxel Resolution.

Figure 12:
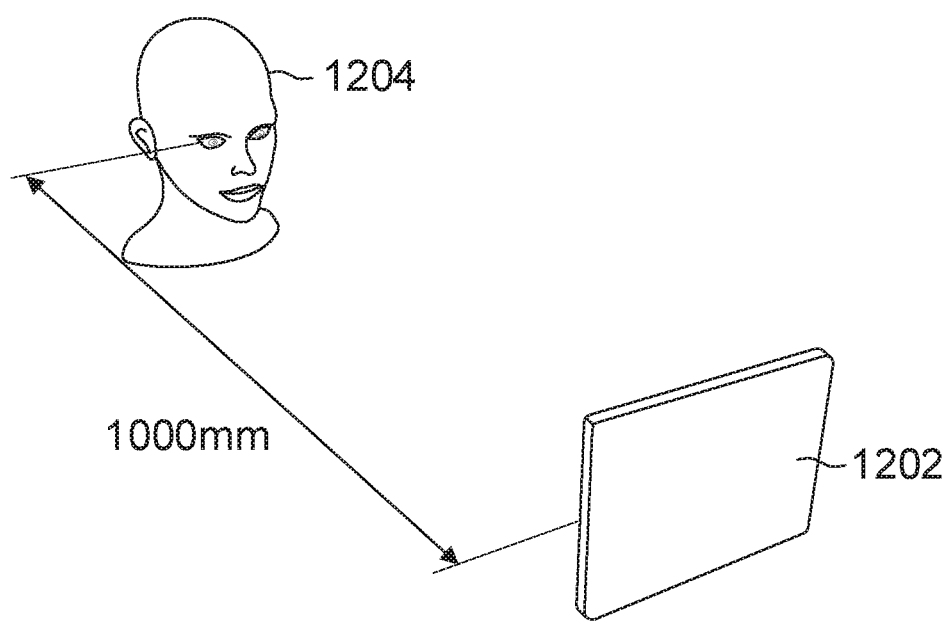
FIG. 12 is a schematic perspective view of a display device using an aperture expander according to some embodiments.

FIG. 12 depicts a second exemplary use case highlighting voxel resolution improvements provided by the presented LF display structure. In particular, the second use case presents a 24" real LF desktop display design wherein the disclosed aperture expander structure is used for improving voxel spatial resolution. FIG. 12 also depicts some relevant viewing geometry. A single viewer 1204 is sitting at a 1000 mm distance in front of the display 1202. The display is projecting multiple views in the horizontal direction to the viewer's eyes. In the vertical direction, beams are diffused in order to provide a wide vertical viewing window.

An example configuration for a light field display structure with a beam expander designed for increasing voxel resolution is described with reference to FIG. 8. In this example, light is emitted from μLED rows 802 wherein each μLED component is 2 μm×2 μm and is separated by a 3 μm pitch. An LF pixel aperture size 806 is 250 μm and a cylindrical projection lens 816 focal length is 1 mm. A 50 μm thick polystyrene foil with grooves is used in a tilting plate array 803. In the μLED matrix the red, green and blue components have the same size and they are bonded as alternating rows in the vertical direction. Their colors are combined in the projected beams as the presented example structure has optical power only in the horizontal direction. Each LF pixel has three differently colored rows of 83 μLEDs, which are used for projecting 83 unique views to a viewing distance of 1 m. At this distance, they cover a viewing window which is around 250 mm wide. In order to make the pixels visible from all parts of the display, the whole flat display surface is covered with a polycarbonate 2 mm thick Fresnel lens 818 that focuses the projected beams towards a central point positioned on the display normal at 1 m distance. This arrangement makes the single LF pixel viewing windows overlap and a 250 mm wide viewing area is formed for a single user.

A geometric image size at the 1 m viewing distance from one 2 μm μLED is 2 mm, as calculated using the system's geometric magnification ratio of 1000:1. If this sub-pixel projection could be realized without diffraction blur, two side-by-side μLEDs could be imaged into the eye through the pupil simultaneously and the SMV condition could be fulfilled. Unfortunately, diffraction effects from the 250 μm wide projection lens aperture increase the beam divergence and the diffracted spot size falling on the eye is ~5.4 mm with green μLEDs. With blue components the spot size would be somewhat smaller and with red components larger. This means that without the beam expander arrangement, only one blurred spot from two neighboring μLEDs could be resolved.

In order to increase the spatial resolution in the LF image, an aperture expander structure is positioned on top of the LF display 1202. In this example, the diffraction gratings 808, 810 are both 76.5 μm thick polystyrene grating foils with 1000 lp/mm positioned at 1.0 mm distance from each other. The grating interferometer splits the original beam into three parts with substantially equal light intensities and the distance between right and left side childbeams becomes approximately 1.0 mm for the blue, 1.3 mm for the green and 1.7 mm for the red sources. This color separation is presented and described in relation to previous FIG. 10. Spatial light modulator 812 in this configuration is an LCD panel with approximately 300 μm pixels (fitted to the child-beam size) without color filters is positioned on top of the beam expander in order to block out the unnecessary diffraction orders. By including the aperture expander, the combined beams after the expander structure have reduced diffraction blur, making the spot sizes on the eye pupil much closer to the geometric size.

Additional Embodiments.

In some embodiments, the first and second diffractive structures are etched, printed, or otherwise generated on opposite sides of a single sheet of material. Some embodiments use a grating interferometer structure with variable grating periods. In embodiments described above, the first and second grating structure have substantially the same density of grating lines. In some embodiments, however, the second grating of the grating interferometer structure has slightly different grating parameters (e.g. line density) than the first. In such an embodiment, the expanded beam would either diverge or focus. The focal distance may be controlled by expanding or reducing the aperture size of the beam with the SLM. This allows for controlled beam focusing to different focal planes, making the image quality better. In other words, the crossing beams may be made to focus to the same point where they cross. The second grating may also have an electronically tunable grating period in which case the LF display may provide additional control over the focus range of the beams. This kind of structure may be realized e.g. with an acoustic wave on an elastic material induced with piezoelectric actuators or by periodically stretching and relaxing an elastic grating foil.

In some embodiments, a light field display includes an LF display pixel source configured to emit collimated beams of light that intersect at various focal planes and an aperture expander that includes a diffractive grating interferometer and an SLM.

In some such embodiments, the LF display pixel source includes a light emitting layer having at least one light source, a tilting plate positioned in front of the light emitting layer, and a collimating lens positioned in front of the tilting plate. The light source may be a white light source, and the SLM may have color-filter pixels for modulating the projected beams. The light source may include at least one red, one green, and one blue light source, and the SLM may include pixels for passing or stopping the projected beams. The light sources may be µLEDs. Alternatively, the light sources may be laser diodes.

In some embodiments, the diffractive grating interferometer includes a first diffraction grating for separating colors and widening beam apertures and a second diffraction grating for compensating an angular deviation to propagation directions caused by the first diffraction grating. The first and second diffraction grating may be optically identical or may at least have the same grating line density.

The SLM may operate to block (i) beams from diffraction orders that are not used in the image formation and/or (ii) beams not propagating along the intended view directions.

In some embodiments, a LF display aperture expander is provided. The aperture expander includes: a first diffraction grating for separating colors and widening apertures of light beams received from a LF pixel projector cell; a second diffraction grating for compensating an angular deviation to propagation directions of the light beams caused by the first diffraction grating; and a SLM for passing and blocking various orders of light beams received from the second diffraction grating, wherein the SLM is synchronized with activation of the LF projector cell.

In some embodiments, a method is provided for expanding projector beam aperture sizes in a LF display system. In the method, at least one collimated LF projector beam is generated using a LF pixel projector cell that includes (i) a light emitting layer, (ii) a refractive tilting plate for shifting light source positions with respect to an optical axis, and (iii) a collimating lens. The at least one collimated LF projector beam is passed through a first diffraction grating that sends different colors of the beam towards different propagation directions and enlarges beam aperture size. The diffracted LF projector beam is passed through a second diffraction grating that tilts different colors of the beam back towards an optical axis. The color-separated and aperture-enlarged projector beam is modulated with an SLM.

The gratings may be nanoimprinted polymer foils. The gratings may be a single polycarbonate sheet with embossed grating structures on both sides. The SLM may be an LCD panel.

Other Discussion.

In general, unwanted diffraction from small apertures is a problematic physical limitation that is very difficult to solve with any means other than expanding an aperture. The presented aperture expansion methods do not affect the spatial resolution on the display surface, and higher resolutions can be obtained through a larger depth range than with simple refractive or reflective aperture expansion methods. A true holographic system based on direct modulation of light fields would not have this problem, but those holographic systems require much smaller SLMs to function properly.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more optical processors, one or more SLMs, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in part by using a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement an image engine, controller, timing module, operating system, etc. for use in a LF display device.

What is claimed:

1. A light field display device comprising:
a light-emitting layer comprising a plurality of individually-controllable light-emitting elements;
an optical layer, overlaying the light-emitting layer, comprising a plurality of collimating lenses, each lens corresponds to a group of light-emitting elements of the plurality of light-emitting elements and configured to collimate light emitted by the corresponding light-emitting elements into respective original collimated light beams emitted in various respective directions;
a first diffractive grating, overlaying the optical layer, configured to split each of the original collimated light beams into a first generation of collimated child beams;
a second diffractive grating, overlaying the first diffractive grating, configured to split each of the first generation of collimated child beams into a second generation of collimated child beams; and
a spatial light modulator, overlaying the second diffractive grating, configured to selectively render opaque a portion of the spatial light modulator, so that a second beam, of the second generation of collimated child beams, that reaches the spatial light modulator is blocked if the second beam has a direction different from a direction of an original beam, of the original collimated light beams, that the second beam is split from by the first and the second diffractive gratings.

2. The display device of claim 1, wherein the spatial light modulator is an LCD panel.

3. The display device of claim 1, wherein grating lines of the first and second diffractive gratings are substantially parallel.

4. The display device of claim 1, wherein grating lines of the first and second diffractive gratings have substantially the same density of line pairs.

5. The display device of claim 1, wherein the collimating lenses are cylindrical lenses.

6. The display device of claim 1, wherein the collimating lenses are convex lenses.

7. The display device of claim 1, further comprising a moveable refractive layer between the light-emitting layer and the optical layer.

8. The display device of claim 1, wherein the first and second diffractive gratings are separated by between 0.5 mm and 5 mm.

9. The display device of claim 1, wherein the first and second diffractive gratings are separated by between 5 mm and 10 mm.

10. The display device of claim 1, wherein the plurality of individually-controllable light-emitting elements in the light-emitting layer are arranged in a two-dimensional array.

11. The device of claim 1, further comprising a processor configured to synchronize timing of light emission of the original beam, collimated from a respective light-element of the light-emitting elements, with the selective rendering of the spatial light modulator.

12. The device of claim 1, wherein the spatial light modulator is a single LCD panel.

13. A method of providing a light field display, the method comprising:

selectively emitting light from at least one light-emitting element in a light-emitting layer comprising a plurality of light-emitting elements;

collimating the emitted light into original collimated light beams, emitted in various respective directions, using an optical layer comprising a plurality of collimating lenses;

splitting each of the original collimated light beams into a first generation of collimated child beams using a first diffractive grating;

splitting each of the first generation of collimated child beams into a second generation of collimated child beams using a second diffractive grating; and blocking a second beam, of the second generation of collimated child beams, using a spatial light modulator, if the second beam has a direction different from a direction of an original beam, of the original collimated light beams, that the second beam is split from by the first and the second diffractive gratings, the blocking is by selectively rendering opaque a portion of the spatial light modulator.

14. The method of claim 13, wherein light is selectively emitted from a plurality of the light-emitting elements to generate an image.

15. The method of claim 13, wherein collimating the emitted light is performed using a microlens array.

16. The method of claim 13, wherein the timing of light emission of the original beam, collimated from a respective light-element of the light-emitting elements, is synchronized with the selective rendering of the spatial light modulator.

17. The method of claim 13, wherein the spatial light modulator is a single LCD panel.

* * * * *